April 14, 1959 V. C. WARDELL 2,881,574

PACKAGING METHOD AND APPARATUS

Filed Aug. 25, 1955 14 Sheets-Sheet 1

INVENTOR:
VERRIS C. WARDELL
BY
Curtis, Morris & Safford
ATTORNEYS.

April 14, 1959 V. C. WARDELL 2,881,574

PACKAGING METHOD AND APPARATUS

Filed Aug. 25, 1955 14 Sheets-Sheet 2

INVENTOR:
VERRIS C. WARDELL
BY
Curtis, Morris & Safford
ATTORNEYS:

April 14, 1959 V. C. WARDELL 2,881,574

PACKAGING METHOD AND APPARATUS

Filed Aug. 25, 1955 14 Sheets-Sheet 3

INVENTOR:
VERRIS C. WARDELL
BY
Curtis, Morris & Safford
ATTORNEYS:

INVENTOR:
VERRIS C. WARDELL
BY
Curtis, Morris & Safford.
ATTORNEYS:

April 14, 1959 V. C. WARDELL 2,881,574

PACKAGING METHOD AND APPARATUS

Filed Aug. 25, 1955 14 Sheets-Sheet 5

INVENTOR
VERRIS C. WARDELL
BY
Curtis, Morris & Safford
ATTORNEYS

PACKAGING METHOD AND APPARATUS

Filed Aug. 25, 1955

INVENTOR:
VERRIS C. WARDELL
BY
Curtis, Morris & Safford
ATTORNEYS.

INVENTOR:
VERRIS C. WARDELL
BY
Curtis, Morris & Safford
ATTORNEYS:

INVENTOR:
VERRIS C. WARDELL
BY
Curtis, Morris & Safford
ATTORNEYS:

INVENTOR:
VERRIS C. WARDELL
BY
Curtis, Morris & Safford
ATTORNEYS.

April 14, 1959 V. C. WARDELL 2,881,574

PACKAGING METHOD AND APPARATUS

Filed Aug. 25, 1955 14 Sheets-Sheet 10

INVENTOR:
VERRIS C. WARDELL
BY
Curtis, Morris & Safford
ATTORNEYS.

April 14, 1959 V. C. WARDELL 2,881,574

PACKAGING METHOD AND APPARATUS

Filed Aug. 25, 1955 14 Sheets-Sheet 11

INVENTOR:
VERRIS C. WARDELL
BY
Curtis, Morris & Safford
ATTORNEYS.

INVENTOR:
VERRIS C. WARDELL
BY
Curtis, Morris & Safford
ATTORNEYS:

April 14, 1959 V. C. WARDELL 2,881,574

PACKAGING METHOD AND APPARATUS

Filed Aug. 25, 1955 14 Sheets-Sheet 13

INVENTOR:
VERRIS C. WARDELL
BY
Curtis, Morris & Safford
ATTORNEYS:

INVENTOR:
VERRIS C. WARDELL
BY
Curtis, Morris & Safford
ATTORNEYS.

United States Patent Office 2,881,574

Patented Apr. 14, 1959

2,881,574

PACKAGING METHOD AND APPARATUS

Verris C. Wardell, Rockville Centre, N.Y.

Application August 25, 1955, Serial No. 530,433

45 Claims. (Cl. 53—29)

This invention relates to a method and to an apparatus for making small packages, such as tea bags and the like.

An object of the invention is to provide a greatly improved manner of producing individual packets of loose, bulk material, such as tea or the like.

A further object is to provide a very efficient, dependable and inexpensive system which can take loose, bulk material in large quantity and flat, unformed bag material in large rolls, and then wrap and seal measured quantities of the bulk material into individual packets enclosed within small pieces of the bag material, the production of these packets being at very high speed.

Other objects will be pointed out in or understood from the description given hereinafter.

The wrapping and sealing of loose bulk material into small individual packets presents a number of very complex problems which either must be overcome or avoided by proper design in order to produce a commercially successful operation. Tea bag packing machines are illustrative.

In such a machine, a precisely measured amount of the loose tea, which is easily spilled, must be held together while a piece of thin fragile paper is folded and tightly sealed around it. One early machine for doing this had a hollow mandrel, open at one end, which was loaded with the proper amount of tea, and then covered with a piece of filter paper while the mandrel held the tea and supplied a stiff frame for folding the paper into an envelope. The mandrel was then removed and the sealing of the envelope completed after transferring the tea into it. A big difficulty with this machine was that there has been no simple and easy way to fold small sheets of paper, especially fragile paper, around a stiff mandrel to obtain precisely and perfectly formed envelopes. Accordingly, although this single mandrel machine for making tea bags was one of the first ever developed, its inherent inefficiency, slow speed and high cost have caused it to be generally discarded in favor of other more elaborate and cumbersome ways.

One present day machine for making tea bags employs a continuous length of paper stock whose width is just greater than twice the length of a tea bag. The forward end portion of the paper stock, as it is advanced lengthwise through the machine, is folded in two along its center line, its two side edges being as evenly aligned with each other as possible. Then while folded the paper is passed over and around a stationary, narrow, flattened and hollow arm through which the loose tea can be dispensed within the folds of the paper as it moves downward. The paper stock carries a thermoplastic adhesive on its inside surface and can be sealed by heating and pressing the layers of the paper together. When the front edge of the folded paper has moved a short distance beyond the end of the hollow arm, this edge and the side edges for a distance equal to the width of a tea bag are sealed by an L shaped heat-sealing jaw. The envelope thus partially formed by this seal is then advanced farther beyond the hollow arm and filled with tea dispensed from the end thereof. The next sealing "bite" by the L shaped jaw then seals the top edge of this filled envelope and the bottom and side of the next, and so on, one envelope after another.

This prior machine for making tea bags works well only so long as the paper stock is evenly aligned as it passes over the hollow tea dispensing arm within the side edges of the paper. Unfortunately, there is a strong tendency for the paper, as it moves along the arm, to slip back and forth around it and thus to shift its side edges substantially out of alignment with each other. When this happens, the L shaped sealing jaw of the machine does not engage both side edges of the paper and the one edge which it does engage presents its adhesive coated surface to one face of these jaws. The paper, instead of being bonded to itself, adheres instead to the jaw of the machine and as a consequence the whole operation must be halted to clear the difficulty. Thus, although a machine using this method of envelope sealing can operate at a faster rate than a simple mandrel machine, the former tends to misfunction all too frequently and is therefore not an ideal solution to the problem of mass production at low cost.

The foregoing outline of the history of and the problems involved in the packaging of tea, it is hoped, will help present the present invention in its proper perspective and will aid in the understanding of its nature and advantages.

In accordance with the present invention, a plurality of open ended, hollow mandrels spaced from each other and arranged in a row are each filled from a large supply of loose bulk material, such as tea, and then collectively are covered or wrapped with a single strip of bag material cut from a large supply roll. After being folded on the mandrels, the strip has a channel or U shaped form; thereafter, the mandrels are moved closer together and the strip is distended on top and pinched together between each mandrel to form the strip into a plurality of individual packets or bags, one around each mandrel. Finally, the bags are removed from the mandrels and then entirely sealed, the contents of each mandrel having been transferred to its respective bag prior to this sealing. The packets or bags so formed are almost invariably perfect, but even when not, they do not interfere with the production of successive ones. The physical apparatus also provided according to the invention for executing this method is relatively simple and is virtually free of any tendency to misfunction even through operated at high speed for long periods of time.

A fuller understanding of the above outlined invention together with a better appreciation of its many advantages will best be gained from the following detailed description given in connection with the accompanying drawings in which.

Figure 1:
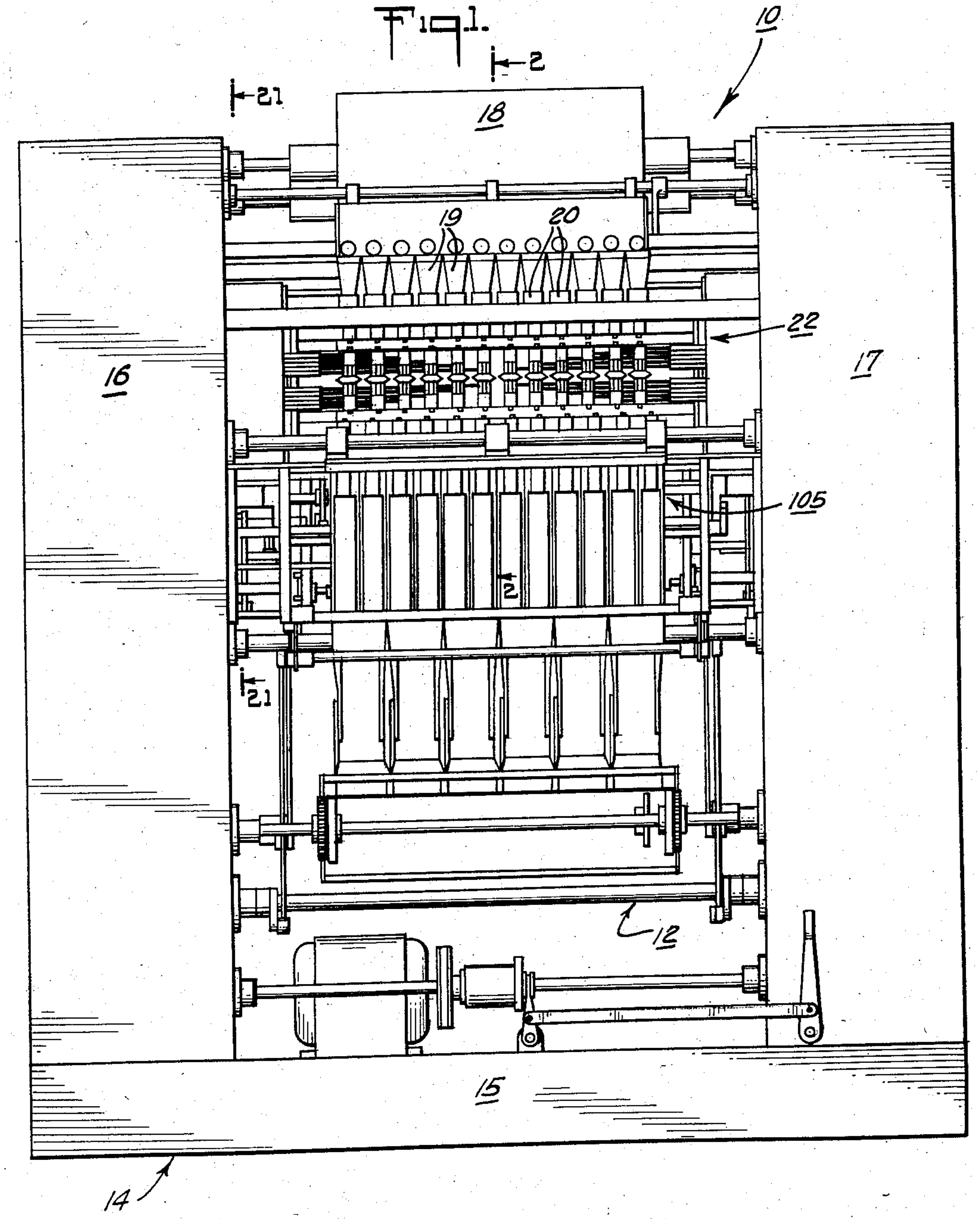
Figure 1 is a front view of a machine embodying features of the invention.

Referring now particularly to Figure 1, there is shown herein in front view a bag making and filling machine, generally indicated at 10, embodying features of this invention. Positioned beneath this machine is a cartoning machine, generally indicated at 12, which is disclosed and claimed in my co-pending United States patent application Serial No. 520,518, filing date July 7, 1955. Both of these machines are adapted to be supported on a single frame 14 and are particularly suited for operation together although, of course, each could be supported and used independently of the other. Frame 14 includes a base 15 upon which is mounted a suitable motor and to which are fastened the side panels 16 and 17. These side panels enclose the drive mechanisms which operate and control each of the machines 10 and 12. The important details of the mechanisms associated with machine 10 will be described hereinafter, the details of the mechanisms associated with machine 12 are disclosed in the above mentioned co-pending application.

Figure 2:
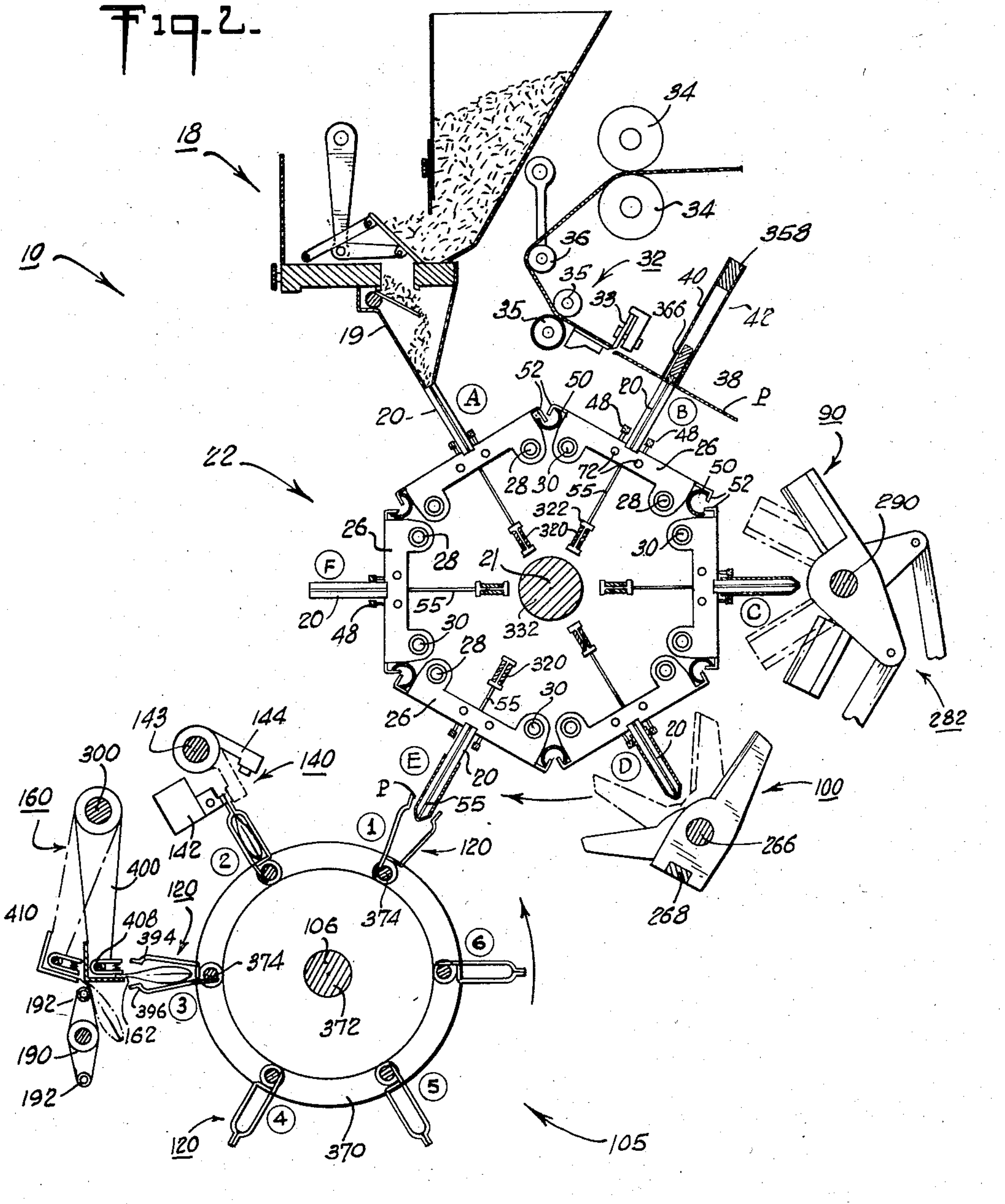
Figure 2 is a side view shown schematically of a portion of the machine in Figure 1 taken as indicated by line 2—2 therein.

Figure 2 is a schematic side view of machine 10 taken as indicated in Figure 1. As seen in this schematic view, a hopper 18, which is adapted to contain loose tea or the like, is positioned near the top of the machine and has a number of funnel-like chutes 19 leading downward from it. These chutes and the hopper dispense the loose tea at proper time and in measured quantities to the hollow mandrels 20. These mandrels are arranged radially around an axis of rotation 21 in six sets or rows in a Ferris-wheel arrangement generally indicated at 22. In the machine herein illustrated there are twelve mandrels to each set though it is to be understood that any desired number can be used. The six sets of mandrels supported by Ferris-wheel arrangement 22 are rotated sequentially in steps clockwise around axis 21 to a filling station A, a bag material folding station B, an intermediate sealing station C, a cutting station D, a bag removing station E and a final station F. This step by step rotation of Ferris-wheel arrangement 22 is controlled by a Geneva drive which is well known to the art and therefore will not be described in detail. Each set of these mandrels is arranged in a row along a straight line perpendicular to the plane of Figure 2 and parallel to the plane of Figure 1.

Figures 8, 9, 10, 11, 12, 13:
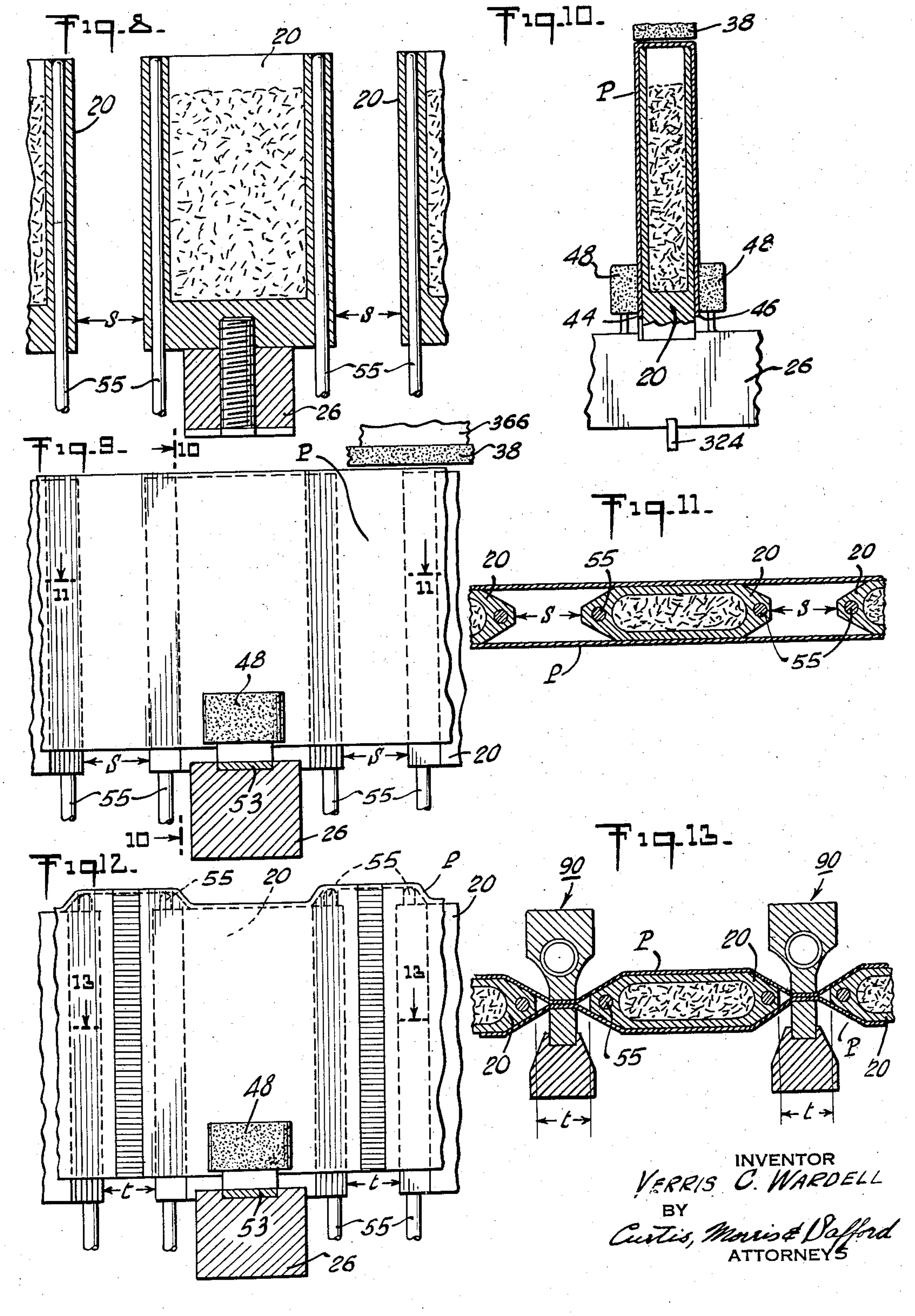
Figure 8 is a partial section view of the row of mandrels positions at station A in Figure 2 just after they have been filled.
Figure 9 is a partial view of the row of mandrels at station B in Figure 2 after they have been covered with a strip of bag material and showing their spacings.
Figure 10 is a section view taken as indicated by line 10—10 in Figure 9.
Figure 11 is a section view taken as indicated by line 11—11 in Figure 9.
Figure 12 is a partial view of the row of mandrels at station C in Figure 2 showing the strip of bag material pinched and distended, its opposites faces being sealed together along each side of each mandrel thereby to partially form each bag around its mandrel.
Figure 13 is a section view taken as indicated by line 13—13 in Figure 12 and showing sets of the heat-sealing jaws at station C.

As can be seen in Figure 8, which is a partial section view (with some parts broken away) of the mandrels at station A, each mandrel 20 consists of a thin walled open-ended rectangular box. All the mandrels in the six sets or rows of them are alike. The space within each mandrel is made large enough to hold the contents of an individual bag while the bag is being formed around the mandrel by machine 10. The spacings between mandrels at station A are the equal distances *s*.

As shown in Figure 2, the twelve mandrels in each set are supported radially in a direction extending from the axis of rotation 21 by the respective mandrel carriages 26 which lie generally along the chords of a circle. The twelve carriages 26 of each of the six sets of them are supported by respective bearing rods 28 and 30 which extend parallel to the plane of Figure 1 and perpendicular to the plane of Figure 2. The carriages 26 are able to slide along their respective bearing rods 28 and 30 closer together and farther apart, as will be explained.

After a set of mandrels is filled with bulk material at station A in Figure 2, all the sets are rotated to the next respective stations. The mandrels which were at station A thus advance to station B where the operation of forming an individual bag around each mandrel in the set is begun.

At station B a short length of material for forming these bags, for example, filter paper containing a thermoplastic adhesive concentrated on one side and which can be heat activated, is fed across the top of the mandrels as indicated by the length P. This material is fed adhesive side down from a feeding mechanism, generally indicated at 32, over a knife edge shearing mechanism 33, being fed in discrete lengths each time a new set of mandrels is brought into position. The bag material is pulled continuously and smoothly from a supply reel (not shown) by means of mating rollers 34, which rotate continuously, and lead the bag material to mating rollers 35. These last rotate only at intervals and then only enough to feed a discrete length of material in position over the mandrels as required. When rollers 35 are not rotating the material between them and rollers 34 is kept taut by means of a dancer roller 36 which moves back and forth in the well known manner.

The length of material fed each time by rollers 35 is sufficient to cover the open ends and the front and back sides of the mandrels in a set. The width (i.e. the dimension perpendicular to the plane of Figure 2), of the material supplied by mechanism 32 is slightly greater than the overall length of a row of mandrels when spaced apart the distances *s* indicated in Figures 9 and 11.

In Figure 2 each strip P of bag material is fed from left to right simultaneously with the advance of a set of mandrels to station B so that the strip will necessarily pass over the top of the mandrels and be properly positioned for subsequent forming upon them. Since this way of feeding is self-aligning and since, in the first place, flat strip material in a continuous length is so easy to feed, bag material can be supplied to the machine dependably and at a rate easily sufficient to keep pace with its fastest operation.

After a strip P of bag material has been properly positioned over the top ends of the mandrels at station B, a pressure pad 38 (see also Figures 9 and 10), which is positioned a short distance above the material and which extends the length of the row or set of mandrels, is moved down to clamp the strip across the top, open ends of the mandrels. Shortly after clamping, shear mechanism 33 (Figure 2) is operated and the strip P is severed from the supply sheet of material. Thus none of the bag material is subject to any appreciable tension during this stage of its handling and there is little or no danger that it will be torn or ripped. This not only saves material, but helps insure perfectly formed bags. Also, since the material is fed in flat unfolded form to station B no equipment other than the several simple rollers 34, 35, and 36 is required in the feeding mechanism 32. This further reduces the possibility of mis-functioning or breakdown of the machine.

In this multiple mandrel arrangement, the bag material used has a large lateral dimension or width perpendicular to the plane of Figure 2 and is so fed to the mandrels rather than being sliced lengthwise and then fed in narrow strips, one strip to each mandrel. Thus only a single paper feeding mechanism is necessary to supply a number of mandrels, rather than one mechanism for each mandrel. Moreover, and perhaps more importantly, the amount of bag material which must be wasted in forming each bag in this single feed to multiple mandrels is far less than the amount which would be wasted if the bag material were supplied in narrow widths as a separate strip to each mandrel. The reason for this last is that in any usual bag material feeding arrangement, a small amount of the strip material must be added to the width of the strip over and above the width necessary for forming a bag in order to allow for side to side play in the feeding of the strip. This small extra amount is roughly the same for any strip whether wide or narrow. Therefore by using one wide strip to form a number of bags, the material wasted per bag is reduced to the vanishing point.

Figures 3, 4:
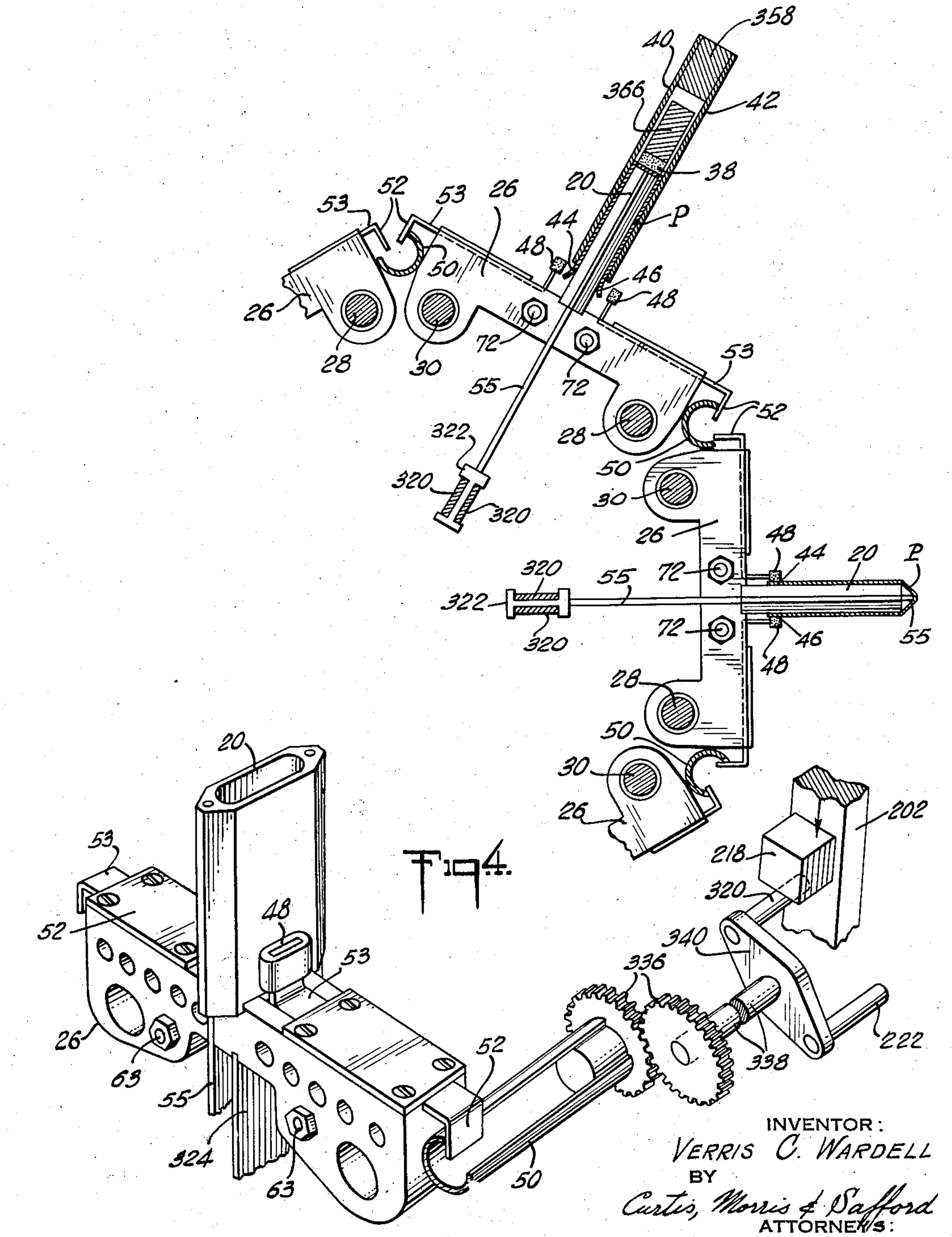
Figure 3 is an enlarged portion of Figure 2.
Figure 4 is a perspective view of one mandrel, its carriage, and a part of the control mechanism for the mandrel.

In Figure 2 with strip P clamped against the mandrels by pad 38 at station B and after shear 33 has been operated so that both ends of the strip are free, the two flat planes 40 and 42, which are parallel to the front and rear faces respectively of the mandrels at station B and which normally are held above the line of feed of strip P as shown, are moved downward. The respective paths of travel of these planes are closely adjacent the faces of the mandrels and so, as the planes move downward, they fold strip P in a U shape or channel form over the mandrels. As seen in Figure 3, when planes 40 and 42 have moved down far enough, the ends 44 and 46 of strip P are brought against the faces of the mandrels. These ends 44 and 46 are evenly aligned with each other, this being ensured by adjusting the distance of shear mechanism 33 from the mandrels at station B.

After being brought against the mandrels, these ends are then clamped to the front and rear faces respectively of each of the mandrels by the twelve sets of holding fingers 48 which move together to accomplish this. The movement of fingers 48 is controlled by the camming action of the half-circular tubes 50 (one of which is seen also in Figure 4), located between the ends of mandrel carriages 26. Each of these tubes runs the length of a set or row of mandrels and each engages the bent ends 52 of the bars 53 journalled in carriages 26 and integral with fingers 48. By rotating the left-hand tube 50 at station B clockwise from the position shown, and the right-hand tube 50 counterclockwise, the fingers 48 are freed from their separated position shown and permitted to move together to the position of Figure 5 by means of the compression springs 54 recessed within carriages 26. When a tube 50 is rotated, the force on it along and transverse to its length exerted by fingers 48 would tend to bow the tube. However, this is prevented by the tube being nested, so to speak in the V shaped space between opposite ends of adjacent rows of mandrel carriages 26. Tubes 50 as a result can bear against these ends and thus support themselves. The mechanism for rotating the tubes 50 will be described in detail hereinafter.

With strip P held securely to each mandrel by fingers 48, arms 40 and 42 are raised from the position shown in Figure 3 and pressure pad 38 released thereby leaving the set of mandrels at station B covered with a folded strip P and free for advance to station C. As seen in Figures 9, 10, and 11, the folded strip P is U shaped in form having front and rear faces separated by the thickness of a mandrel and having a top web which encloses the loose tea in each of the mandrels 20.

The advance of the mandrel sets to the next respective stations in Figure 2 brings the mandrels just covered with a strip P of bag material at station B to station C. During this advance from B to C, twelve pairs of pusher rods 55 (seen also in Figures 6 and 9) each rod journaled lengthwise through a side wall of a mandrel, are moved radially outward a short distance. The movement of these rods distends the strip P from its nearly perfect U shaped or channel form so that between each mandrel the strip is drawn upward and pinched together somewhat along its top, web surface as indicated in Figure 12. With the strip so distended, when the front and rear faces of the strip P are brought together between each mandrel, as well as on the outside of the end mandrels, their faces can be sealed smoothly without wrinkles or folds.

To permit these faces to be drawn together without tearing the strip P, there occurs during the advance of a set of mandrels from station B to station C, and along with the outward movement of rods 55, a closing together movement of the mandrels in the set. This closing movement is along bearing rods 28 and 30 and results in a reduction of the distances *s* by which these mandrels had been spaced apart at station B as seen in Figure 9.

Figures 5, 6, 7:
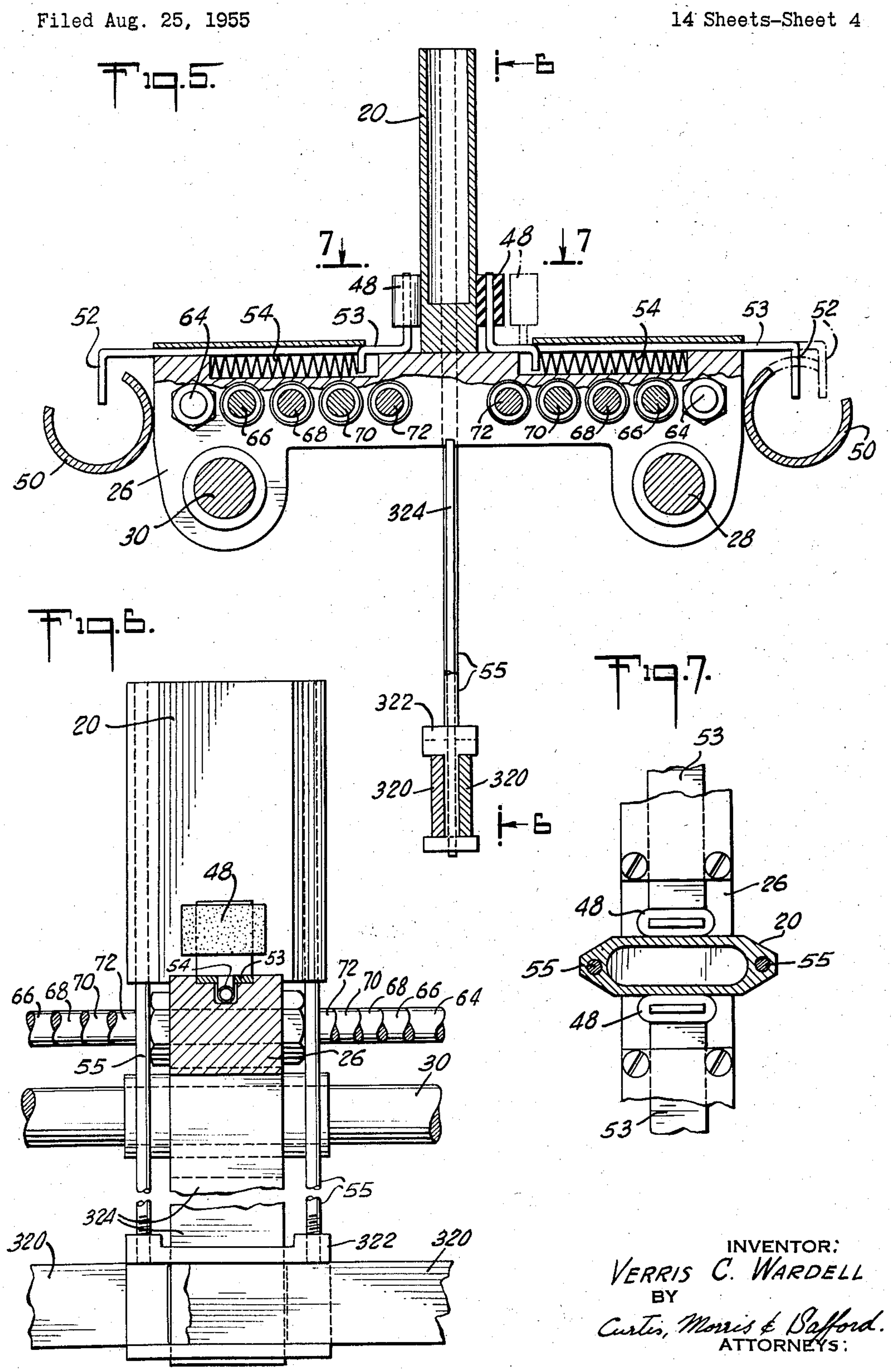
Figure 5 is a side section of a mandrel taken as indicated by line 5—5 in Figure 17 showing carriage and parts of the mandrel spacing mechanism.
Figure 6 is a view taken as indicated by line 6—6 in Figure 5.
Figure 7 is a view taken as indicated by line 7—7 in Figure 5.
Figures 17, 18:
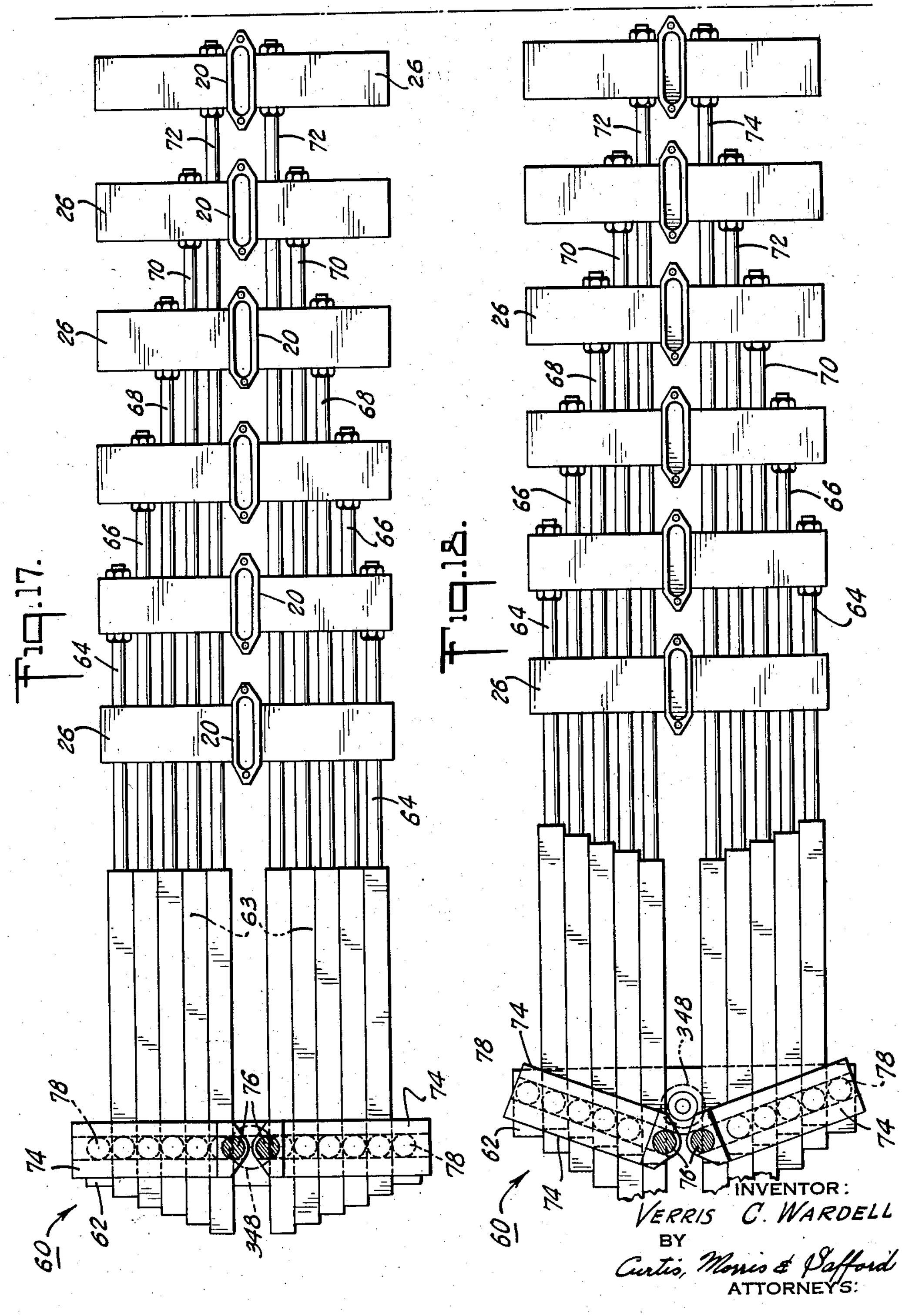
Figure 17 is a plan view showing the left-half of a row of mandrels and showing part of the mechanism which controls their spacing, the spacing here being that of a row of mandrels at station A or station B in Fig- 2.
Figure 18 shows the mandrels in Figure 17 spaced as they would be at station C in Figure 2.
Figure 20:
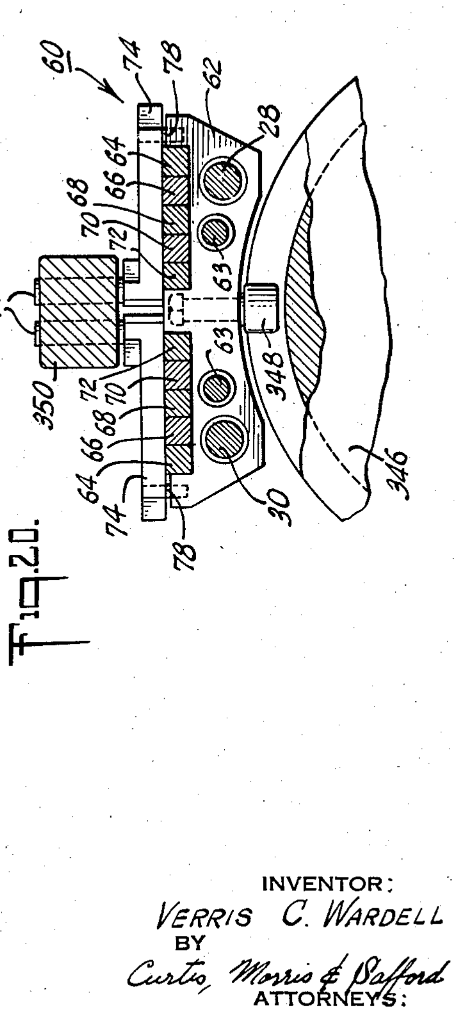
Figure 20 is a section view taken as indicated by line 20—20 in Figure 19 and showing further details of the mandrel spacing mechanism.
Figure 24:
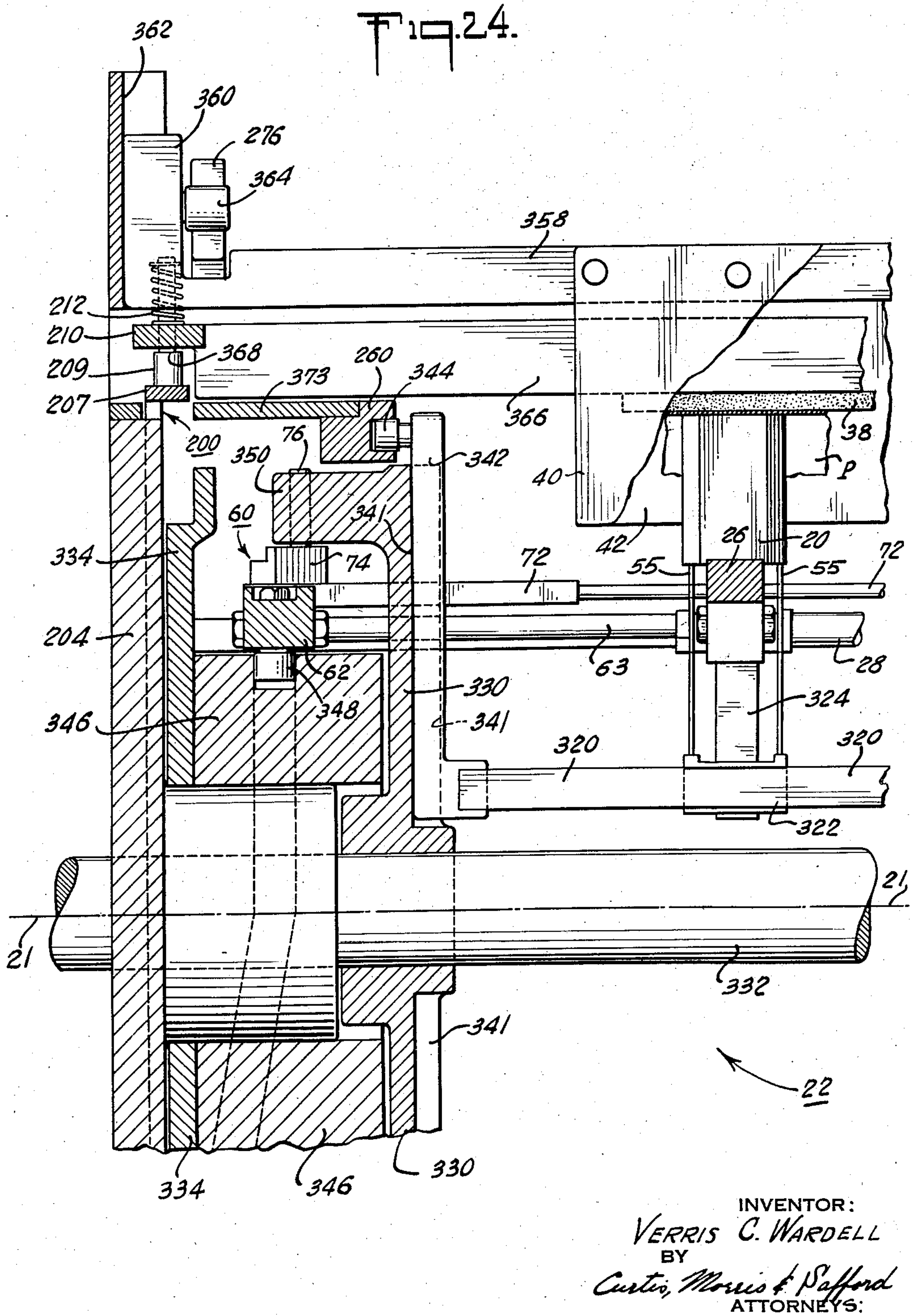
Figure 24 is a section view taken as indicated by line 24—24 in Figure 23 and showing parts seen in Figures 21 through 23.

Referring to Figure 17, a left-hand butterfly cam assembly, generally indicated at 60, controls the spacings between the left six mandrels of the twelve in a row. Assembly 60 includes a moveable carriage 62, also seen in Figure 20, which is supported by and slidable along rods 28 and 30. The left-most mandrel carriage 26 is fixed to carriage 62 by means of the pair of rods 63 and moves with it. This left-most carriage 26, carriage 62 and rods 63 are shown in Figure 24. The same mandrel carriage 26 and rods 63 are also shown in Figure 4. The lateral movements, respectively, of the remaining left-hand mandrel carriages 26 in Figure 17 are less than, though proportional to, the movement of carriage 62. Each mandrel carriage 26 of the left six and other than the left-most one, is connected to a pair of spacer rods 64, 66, 68, 70 and 72 respectively. By moving each pair of these rods the required fraction of the movement of carriage 62, each mandrel carriage 26 is moved the distance necessary to keep all of the mandrels 20 including the left-most one, equally spaced from each other at all times. It is to be understood, of course, that the movements of the right six mandrels are the mirror images of the movements of the left six, being controlled by the same sort of mechanism as assembly 60. Each pair of the spacer rods 64, 66, 68, 70 and 72 is free to slide laterally relative to all the left-hand six mandrel carriages 26 in Figure 17 except the respective carriage to which it is affixed. Thus, as seen in Figure 5, which is a section view of the mandrel carriage 26 second from the left in Figure 17, the pairs of rods 66, 68, 70 and 72 pass freely though snugly through four pairs of holes in carriage 26, while the rods 64 are fastened at their ends to the carriage.

Figure 19:
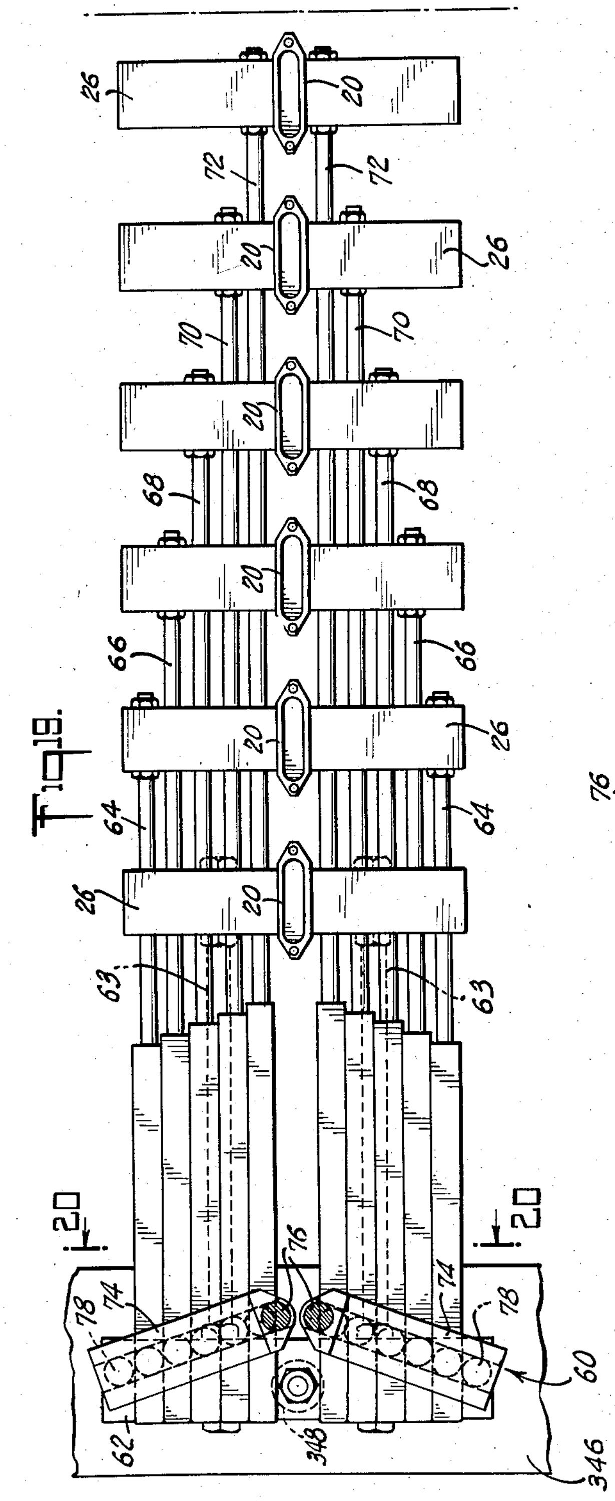
Figure 19 shows the mandrels in Figure 17 spaced as they would be at station E in Figure 2.

Referring to Figure 17, the lateral movements of these five pairs of spacer rods are related to the lateral movement of carriage 62 by means of the pair of butterfly wings 74. These wings 74 are supported and pivoted at their inner ends around the two fixed shafts 76, and at their outer ends around the two moveable shafts 78 which are carried by carriage 62. Thus when carriage 62 moves laterally, each mandrel carriage 26 moves proportionally, the spacings between mandrels always remaining equal, though, of course, changing in magnitude. Here in Figure 17, carriage 62 occupies its intermediate position relative to fixed shafts 76. Figure 18 shows carriage 62 moved to its right-most position and mandrel carriages 26 spaced closest together so that mandrels 20 are spaced by their nearest-together distances *t*. Figure 19 shows carriage 62 moved to its left-most position and mandrels 20 spaced by their farthest-apart distances *u*. The mechanism which controls each butterfly assembly 60 will be described in detail hereinafter.

As mentioned previously, when a set of mandrels is advanced from station B to station C, they are moved closer together. Their nearest-together positions, in which they are spaced by equal distances *t*, is shown in Figures 12 and 13, which are views of the mandrels at station C. When the mandrels are so spaced, the strip P of bag material formed over them and clamped in twelve places to the mandrels by the sets of fingers 48 when the mandrels were spaced by the distances *s*, is now slack in the spaces between mandrels. By designing the spacings *s* and *t* properly relative to the dimensions of the mandrels, the amount of slack in the strip P becomes just enough to permit the front and rear faces of the strip to be brought together between each mandrel. This moving together of the mandrels in conjunction with the wrinkle eliminating action of the push rods 55, which, it should be remembered, takes place simultaneously with this moving together movement as the mandrels are advanced from station B to station C and which acts to distend the web of strip P outward at the corner of each mandrel as previously explained, thus makes possible the forming of strip P into individual bags around each of the mandrels.

Upon arrival at station C, therefore, each strip P is already shaped and distended for being, so to speak, "stitched" into individual bags. Though this "stitching" can be performed in any convenient way, as shown in Figures 2 and 13 it is carried out by means of thirteen sets of heat-pressure bonding jaws, generally indicated at 90. These sets of jaws are momentarily closed in unison from the solid line position shown in Figure 2 to the solid line position shown in Figure 13 while each set of mandrels is standing at station C. By means of heat and pressure these jaws activate a thermoplastic adhesive carried on the inner face of the bag material thus sealing the material in the regions contacted. A set of jaws 90 is positioned between each two adjacent mandrels, a set on the outside of the left-most mandrel and a set on the outside of the right-most mandrel, totaling one more in number than the number of mandrels in a set.

After strip P has been "stitched" into individual bags at station C, jaws 90 are retracted to their open position shown in Figure 2 and the mandrel set at station C is thus freed for advance to station D.

In this sealing arrangement utilizing the heat-pressure bonding jaws 90, the danger that a face of a jaw will accidently come in contact with an adhesive coated face of a strip P and possibly adhere thereto is minute. Moreover, even though any such trouble occurs with one mandrel set, it is not likely to affect the next sets or to require stopping of the machine to clear the trouble. Further, since the pivot of these jaws is also horizontal, they can, if necessary, be in the act of closing between the mandrels before the latter have fully come to rest. This appreciably shortens the "lost" time in moving the jaws closed.

Figures 14, 15:
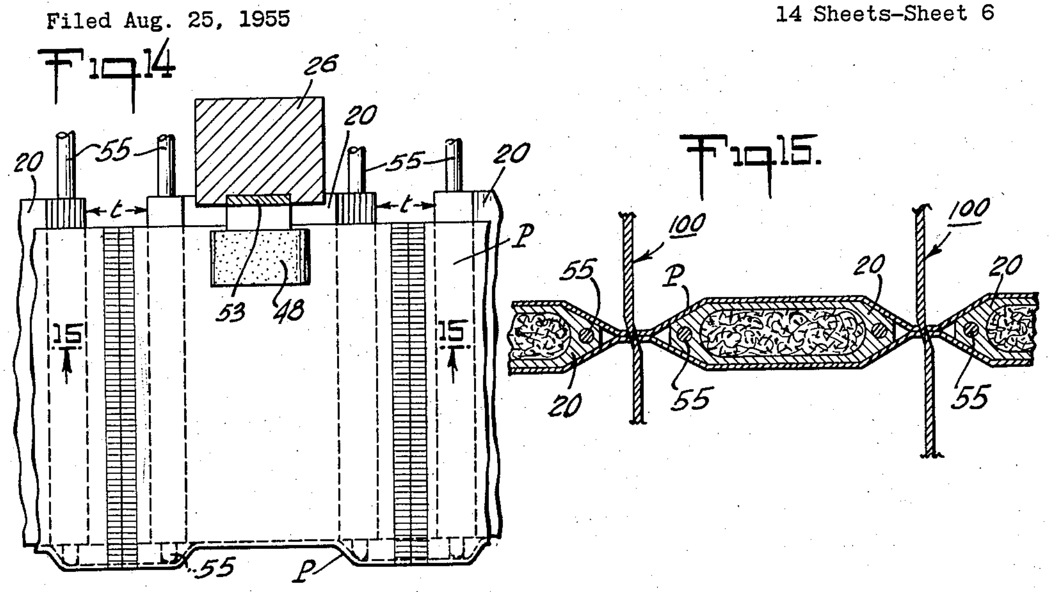
Figure 14 is a partial view of the row of mandrels at station D in Figure 2.
Figure 15 is a section view taken as indicated by line 15—15 in Figure 14 and showing sets of the scissors at station D.

During this advance of the mandrel set from station C to station D, they and their corresponding push rods 55, are held in their respective positions assumed previously in moving to station C. At station D, eleven sets of scissors, generally indicated at 100, each set positioned between two adjacent mandrels, are closed from their open position shown in Figure 2 to the position of Figure 15. These scissors cut strip P along lines between mandrels in the center of the sealed areas produced by bonding jaws 90, these cut lines being shown in Figure 14. After cutting by scissors 100, what was formerly a single strip P is now in the form of twelve separate and individual bags formed around the twelve mandrels at station D. In order to complete the forming of these bags, it is necessary only to withdraw the bags from the mandrels, leaving the bulk material previously contained in the mandrels now within the bags, and to seal the tops of these bags.

As each set of mandrels 20, charged with loose bulk material and covered with a strip P of bag material, is rotated downward in the Ferris-wheel arrangement 22 of Figure 2, i.e. as a set is rotated from station C to station D and then to station E, gravity causes the bulk material within the mandrels to fall against the bag material held across their open ends. Thus, when a set of mandrels reaches station E, the bags formed around each mandrel can be withdrawn therefrom and gravity will cause the charges of loose, bulk material in these mandrels to fall into the bags as they are being removed.

After a set of mandrels with bags formed around them has been advanced from station D to station E, the bags are ready to be removed in preparation for final sealing. During advance from station D, the mandrels 20 in the set are moved from their nearest-together distances *t* to their farthest-apart distances *u* in order to permit easier handling of the bags as they are removed from the mandrels. This spacing movement is, of course, controlled in the way already described.

Figure 16:
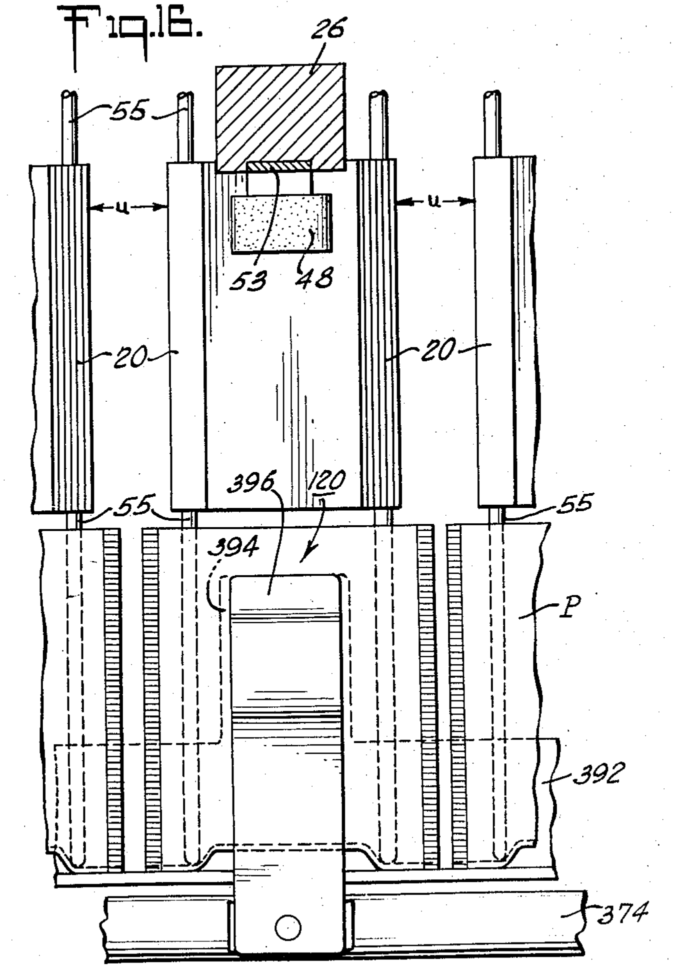
Figure 16 is a partial view of the row of mandrels at station E in Figure 2 just after the bags have been removed from the mandrels and transferred to the pocket brackets.

Shortly after the set of mandrels has arrived at station E, their corresponding sets of holding fingers 48 are spread apart thus releasing the bags formed around them. Along with the spreading of fingers 48, the twelve pairs of push rods 55 are moved further outward radially to the position of Figure 16 thus positively removing each bag from its associated mandrel. As each bag is pushed downward off its mandrel by a respective pair of rods 55, it is received in and held by a corresponding pair of pocket brackets 120. The mechanism for moving rods 55 radially outward at station E will be described in detail hereinafter.

There is one pair of pocket brackets 120 associated with each mandrel in a set, these pairs of brackets being spaced apart in a row perpendicular to the plane of Figure 2 and closely parallel to the set of mandrels at station E. The spacing between adjacent pairs of brackets corresponds to the spacing of mandrels 20 in the set at station E. There are six rows of brackets 120 arranged in six positions evenly spaced around the second Ferris-wheel arrangement 105 and its axis 106, the brackets at each position being adapted to be advanced by rotation counter-clockwise from positions 1 through 6 in steps synchronized with the step-by-step clockwise advance of the sets of mandrels 20.

After the bags with their contents have been transferred from the mandrels at station E to the brackets 120 at position 1, the push rods 55 there are retracted and the empty mandrels are then rotated to station F. During the rotation from station E to station F back to station A the mandrels are moved together to their distances *s*. At station F, the mandrels are not filled, or covered by a strip P or obstructed by any loading or forming mechanism as in the case at the other stations of machine 10. Accordingly each set of mandrels and parts associated with it, when they stand at station F, can easily be reached as seen in Figure 1, for service or repair if this becomes necessary. Moreover, the use of this sixth station F makes for a more convenient structural arrangement of parts and a more convenient disposition of the loading, forming and sealing mechanism of machine 10 than if only five stations and five sets of mandrels were employed.

Referring once again to Figure 2 and to the pocket brackets 120 at position 2 of the second Ferris-wheel arrangement 105, these brackets are brought into place to receive bags simultaneously with the advance of a set of mandrels 20 to station E of the first Ferris-wheel arrangement 22. However, the brackets are in closed condition, i.e. that shown at position 6, when they reach position 1 and must therefore be opened. The mechanism for doing this will be described in detail hereinafter.

As soon as the bags have been deposited in brackets 120 at position 1, push rods 55 are retracted and, simultaneously therewith, the brackets are closed. In the closed position the fingers of each bracket 120 come together just below the top side, i.e. the one still unsealed, of the bag held within them. The loose contents of the bags are, of course, lower than the ends of these fingers; thus, the faces of the portions of the bags above the ends of the fingers are in intimate contact and the bags can be sealed along their tops in a way similar to that by which their sides were sealed. The width of each pair of brackets is made slightly less than the inside distance between a pair of push rods 55 so that when these brackets close, they can not close on any push rod and the rods can be withdrawn from the bags without difficulty.

After rods 55 have been withdrawn from the bags at position 1, these bags and their associated brackets 120 are rotated in steps counter-clockwise to position 2 and then to position 3. It should be remembered that this stepwise rotation is synchronized with the clockwise stepwise rotation of the sets of mandrels 20.

At position 2 of the second Ferris-wheel arrangement 105, the bags held there by brackets 120 are sealed along their tops by the bonding mechanism generally indicated at 140. This mechanism includes a stationary bar-like jaw 142 which runs the length of the row of pocket brackets 120 at position 2 and which is placed low enough to contact the bag material protruding beyond the ends of these brackets but just high enough to clear the brackets themselves. A second bar-like jaw 144 is pivoted at 143 to the mount of the first jaw and is adapted to swing clockwise from open position indicated in dotted line to the solid line one shown. In this latter position the two jaws 142 and 144 press between them, while applying heat, each of the tops of the bags then at position 2. The closing of jaw 144 is synchronized with the rotation of Ferris-wheel arrangement 105 so that as the bags held by a row of brackets 120 reach position 2 and come to rest there with their tops lightly against jaw 142, jaw 144 is momentarily closed to the position shown. Sealing of the bags then takes place in the same way as sealing at station C previously described.

After sealing, jaw 144 swings open to the dotted line position indicated. Though there is some slight possibility that an adhesive coated face of the bag material will contact and adhere to one of jaws 142 and 144, the danger of this is very small because, as pointed out previously, the two top edges of each bag can be evenly matched simply by adjusting the position of shear mechanism 33 relative to the rest position of a set of mandrels at station B. However even this slight danger, is easily avoided by placing jaws 142 and 144 at position 2 just slightly lower than the top edges of the bags there.

Nonetheless, should some material by chance adhere to these jaws, this is unlikely to necessitate stopping of machine 10 because brackets 120 will tend to pull the material free when they advance the bags from position 2 to position 3. This sealing arrangement, like that at station C, is in effect self-servicing.

The next advance of Ferris-wheel arrangement 105 brings the bags just sealed at position 2 to position 3 where they will be discharged from the machine. Upon reaching position 3, brackets 120 are still in closed condition. Shortly after arrival they are opened to release the bags held by them, this opening being in unison with the opening of the row of brackets 120 which just reached position 1. The opening of brackets 120 at position 3 permits the bags within them to be removed, and this is done by the pendulum gripper generally indicated at 160.

Just before the brackets 120 were opened, gripper 160 moved to the right into position so that its twelve jaws 162 can be clamped across the tops of the twelve bags at position 3. Jaws 162 are spring loaded, as will be described in detail hereinafter, and are triggered to closed position along with the opening of pocket brackets 120 at position 3. With each of the twelve bags clamped in the jaws of gripper 160, the latter is swung to the left pulling the bags from the opened brackets 120. During the leftward swing of gripper 160 a rapidly clockwise-rotating beater 190, having two long beater bars 192, flails the downward hanging bags. This will tend to destroy any bag which is not properly formed thus preventing it from reaching the consumer. At the left end of the swing of gripper 160, its jaws 162 are opened and the bags held thereby are released and deposited in the cartoning apparatus described and claimed in the above identified co-pending application.

The general details of the operation and structure of machine 10 have now been described. Through the understanding of this operation and structure the important specific details, about to be set forth, of machine 10 and their relation to structure already described will easily be grasped.

As was mentioned in connection with Figure 2, when a strip P of bag material is folded over a set of mandrels at station B of Ferris-wheel 22, the fingers 48 associated with these mandrels are spread apart and held open for a short time to permit the ends of the strip to be slipped between the fingers and the mandrels. The opening of fingers 48 occurs when the pressure pad 38 is brought into contact with the strip P and just before the plates 40 and 42 are moved downward. Simultaneously, at station E the fingers 48 are also opened to permit the partly formed bags to be removed from the mandrels into the just opening brackets 120 at position 1 of Ferris-wheel 105, these brackets 120 and those at position 3 being opened in synchronism with the opening of fingers 48. Further, along with the opening of brackets 120 at position 3, there occurs the closing of the jaws 162 of the pendulum gripper 160. All of these actions are controlled from the left and right ends of the two Ferris-wheels of machine 10 by mechanisms which are the mirror images of each other, therefore only the left hand ones will be described. These mechanisms are connected to the drive motor by levers and cams which are contained for the most part in the side panels 16 and 17 seen in Figure 1. These levers and cams will, however, for convenience all be shown in Figure 21.

Figure 21:
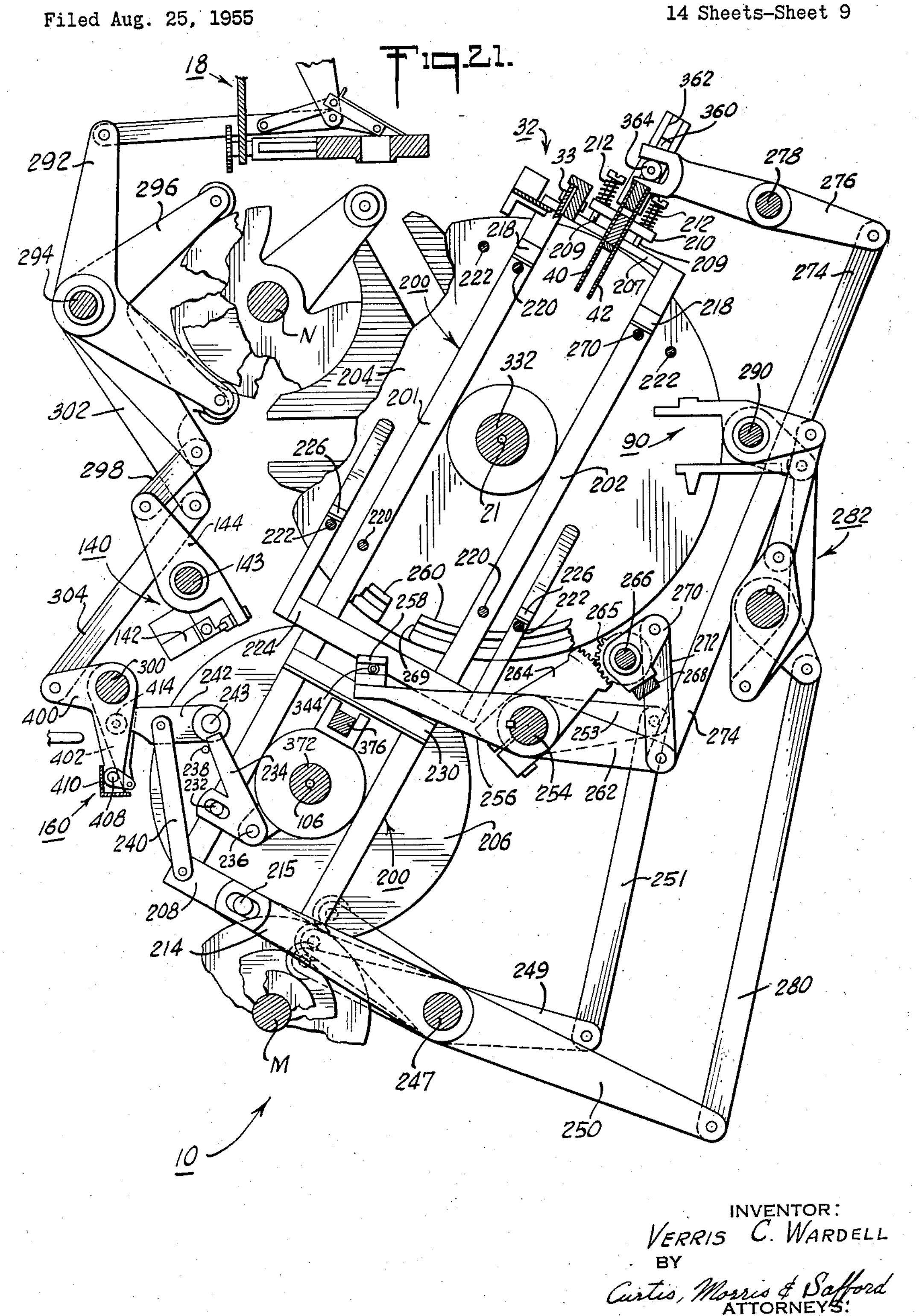
Figure 21 is a side section view with parts broken away and others not shown, taken as indicated by line 21—21 in Figure 1, and showing important details of the operating and control mechanisms for the machine.

Referring to Figure 21 which is a view taken as indicated in Figure 1 with some parts broken away and others omitted, the axis of rotation 21 of Ferris-wheel 22 and the axis 106 of wheel 105 are aligned exactly as was shown in Figure 2. Positioned parallel to and on each side of the line joining these axes, as seen in Figure 21, is a long slide mechanism generally indicated at 200 and including the slide bars 201 and 202 respectively. These bars are free to slide in parallel grooves cut in the fixed hub 204 surrounding axis 21, and cut in the fixed hub 206 surrounding axis 106. Bars 201 and 202 are joined at their upper and lower ends by the arms 207 and 208, respectively. Upper bar 207 carries the two pins 209 upon which is slidably carried the short beam 210, this beam being urged downward on pins 209 by the compression springs 212. The beam 210 (see Figure 24) is connected to the left end of the pressure pad 38 which moves to clamp the strip P of bag material to the mandrels at station B.

Slide 200 is driven down to the position shown and then back upward a short distance to its normal rest position each time a row of mandrels at station B in Figure 2 is to be covered with a strip P. As seen in Figure 21, the movement of the slide is controlled from its lower end by the link 214 pivoted to the arm 208 at 215. When the slide moves downward, it first brings pressure pad 38 into contact with the bag material and mandrels at station B, then it actuates the blade of the shear mechanism 33, the left end of this blade being carried by arm 207 of the slide. As the slide continues to move down, the blocks 218 fastened near its upper end on bars 201 and 202 push against the inner pair of pins 220 (one of which is shown in Figure 4) and through a connection to be described shortly, rotate the two tubes 50 at station B counter to each other to open the mandrel fingers 48. The outer pair of pins 222 associated with the tubes 50 are not contacted by blocks 218.

Near the middle of slide 200 as seen in Figure 21 is positioned other pairs of pins 220 and 222 associated with the tubes 50 and the particular set of mandrels at station E. To rotate these tubes in proper sense to open the mandrel fingers 48 at station E, the pins 222 are contacted by the slide and pushed down. This is accomplished by the U bar 224 fixed to the slide bars 201 and 202 and carrying the blocks 226 which contact pins 222. The upper and lower blocks 218 and 226 are positioned on the slide so that the mandrel fingers 48 at stations B and E open together. The two upper and two lower pairs of pins 220 and 222 seen in Figure 21, when not being contacted by the slide, are free to rotate with Ferris-wheel 22 around axis 21, being carried thereby in a manner to be described shortly. There are two pairs of these pins associated with the left end of each of the six rows of mandrels. Thus, one after another different pairs of pins are actuated by slide 200 in the way just described.

Just below the U bar 224 on slide 200 is a beam arm 230 fixed to bars 201 and 202 and which controls the opening of the pocket brackets 120 at position 1 of Ferris-wheel 105. Near the lower end of slide 200 and pivoted to the left bar 201 at 232 is a lever arm 234 whose function is to open the brackets 120 at position 3. Arm 234 is pivoted at 236 to a fixed point on hub 206 and when slide 200 moves downward, the upper end of arm 234 presses against the pin 238 thereby opening the brackets 120 at station 3.

Pivoted to the left end of the slide arm 208 is a link 240 which is in turn pivoted to the lever arm 242. This arm is pivoted about the fixed point 243 and, when the slide moves down, the left end of the arm locks a toggle mechanism in the pendulum gripper 160 urging its jaws 162 closed on the top ends of the bags being held by the brackets 120 at position 3. The closing of jaws 162 is timed to occur just before the lever arm 234 has opened the brackets 120 at position 3.

Machine 10 is driven from two main shafts M and N seen in Figure 21 by the single motor seen in Figure 1. Shafts M and N are geared together and rotate continuously at the same speed counter-clockwise in Figure 21 making one full revolution for each one-sixth revolution made by the Ferris-wheels 22 and 105. Ferris-wheel 22 is directly connected through its axis 21 to a Geneva drive, part of which is shown in Figure 21 and which is driven from shaft N. Ferris-wheel 105 is geared to Ferris-wheel 22 and rotates opposite thereto.

Driven from shaft M by a cam mounted thereon is the link 214 connected to the lower end of slide 200 and pivoted about the shaft 247. Similarly, the links 249, 250, pivoted about this shaft are driven by respective cams on shaft M. Link 249 controls the closing of scissors 100 at station D, while link 250 controls the closing of heat sealing jaws 90 at station C. The movements of links 214, 249 and 250 are co-ordinated with the step-by-step rotation of Ferris-wheels 22 and 105 so that the bag forming and handling operations at stations and positions around these wheels will occur in the way described previously.

Link 249 at its right end is connected to a link 251 which in turn is connected to the short crank arm 252 fixed to the shaft 254. Thus, when link 249 moves up and down, shaft 254 rocks back and forth. Keyed to shaft 254 is the arm 256 which at its left end carries the cam segment 258. This segment swings into and out of the gap 259 in the fixed ring cam 260. This cam and segment, as will be explained, control the radial movement of the mandrel rods 55 described previously in connection with Figure 2. When segment 258 is moved downward to the position shown in Figure 21, rods 55 at station E occupy the position shown in Figure 16.

Also keyed to shaft 254 in Figure 21 are the arm 262 and the gear segment 264, the latter meshing with a gear 265 fixed to shaft 266 thereby to rock this shaft when shaft 254 rocks. Shaft 266 carries each pair of scissors 100 shown in Figure 2 and is fixed to one blade of each pair. The other blade of each pair idles on the shaft being controlled by the bar 268 which is parallel to and nearly as long as shaft 266. As seen in Figure 21, bar 268 is carried on the crank 270 which idles on shaft 266 and which is connected to link 262 by link 272. Thus, when rocker shaft 254 moves counter-clockwise to the position shown, the scissors 100 are each closed.

When this rocker shaft 254 rotates to its counter-clockwise limit, it moves the paper folding planes 40, 42 at station B downward to their lower limit shown here in Figure 21 and in Figure 3. The connection between these planes and shaft 254 is through link 262 keyed to the shaft, the link 274 and the fulcrum arm 276 pivoted around the fixed shaft 278. Arm 276 at its left end is connected to the planes 40, 42 in the way shortly to be described.

The opening and closing of the heat-sealing jaws 90 at station C is controlled by link 250, seen in Figure 21, which in turn is moved by a cam on shaft M. The right end of link 250 is pivoted to a link 280 which runs to the linkage arrangement generally indicated at 282 and which causes the opposite jaws of each of the heat-sealing jaws 90 to rotate toward and away from each other around the shaft 290. For the position shown of these links, the jaws 90 are closed.

The hopper 18 which charges the mandrels at station A is controlled by the rotation of shaft N through a cam carried on it, and through a crank arm 292 which idles around the fixed shaft 294. Similarly, shaft N controls the closing of the jaws 144 of the heat sealers 140. This is accomplished through a cam mounted on shaft N, the crank arm 296, and the link 298 which connects to the rear end of jaw 144 and swings it around shaft 143. Finally, shaft N swings the pendulum gripper 160 on the rotatable shaft 300 through the action of a cam mounted on shaft N, a crank arm 302, and link 304 which connects to the body of gripper 160.

As was explained previously in connection with Figures 2 and 17, the mandrels 20 in each row as they are rotated in steps past the various work stations are moved closer together and farther apart. This movement is along the bearing rods 28 and 30 which support the mandrel carriages and which are in turn supported for rotation around axis 21 by means not yet described. Running parallel to these rods are the tubes 50 which control the opening and closing of the mandrel fingers 48. The bent ends 52 of the bars 53 journalled in carriages 26, and which are connected to fingers 48, are free to slide lengthwise relative to these tubes. Referring to Figures 3, 5, and 6, a pair of closely spaced flat rails 320 is positioned beneath and parallel to each set of bearings rods 28, 30. These rails slidably carry the blocks 322 fitted between them and connected to the push rods 55 and are themselves moveable up and down relative to their associated bearing rods 28 and 30, thereby to move rods 55 radially inward or outward. These flat rails are slidably supported in the two end structures, one of which is shortly to be described, that carry rods 28 and 30 and tubes 50. The blocks 322 that slide along flat rails 320 are kept in alignment with their associated mandrel carriages 26 by the thin bars 324, seen in Figures 5 and 6, each of which is rigidly connected to the bottom of its mandrel carriage 26 and slidably journalled through the corresponding block 322.

Figure 22:
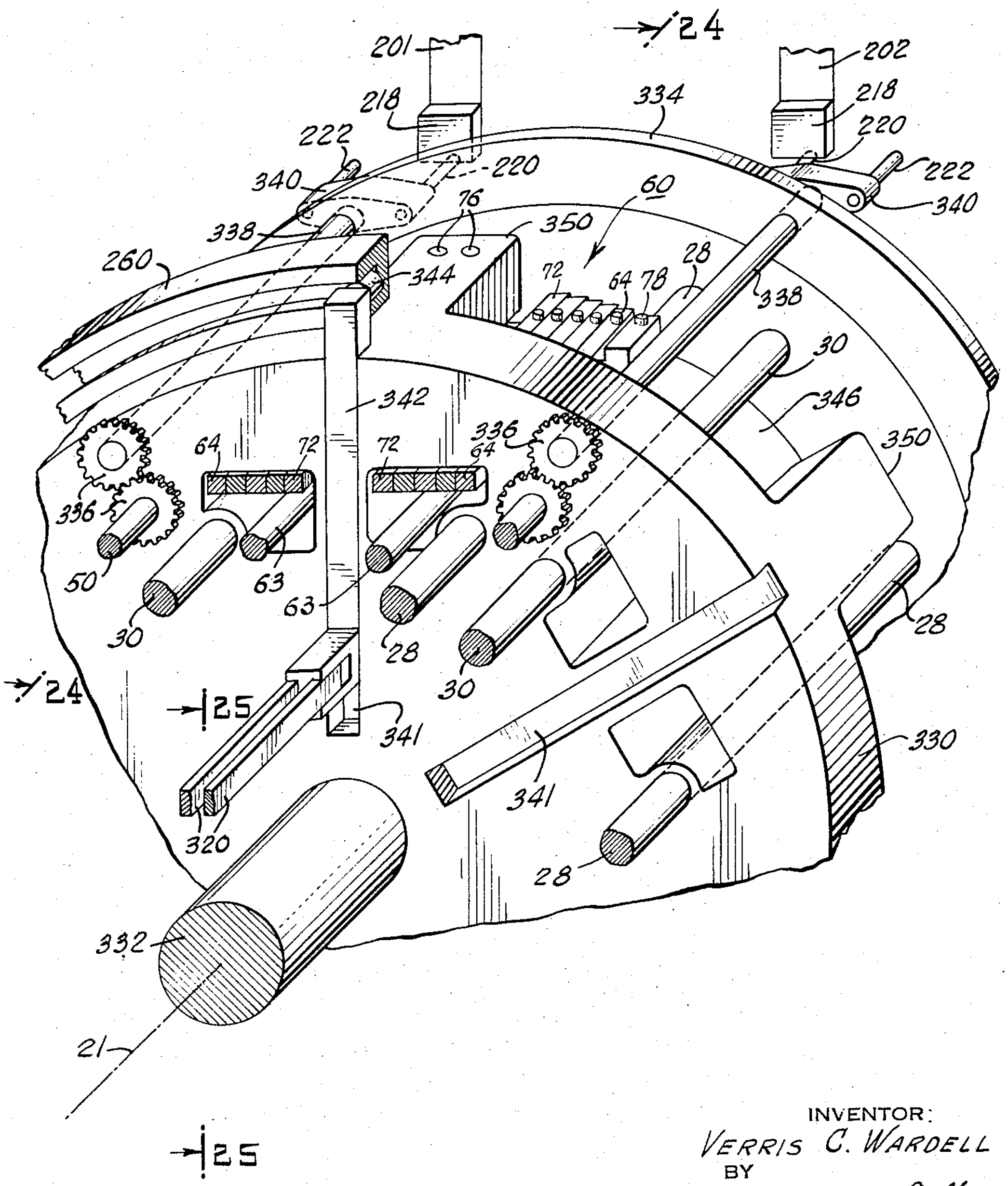
Figure 22 is a perspective view with parts broken away and others not shown of a portion of the end supports and operating mechanism for the Ferris-wheel which carries the six sets of mandrels.

Referring to Figure 22, which shows in perspective view, with some parts broken away and others omitted, the left end supporting structure for rods 28 and 30, tubes 50, and rails 320, this structure includes the plate 330 which is supported by the axle 332 for rotation about the axis 21. Bearing rods 28 and 30 pass through this plate, though they are fixed to it, and support in cantilever fashion the end ring 334. The ends of tubes 50 are rotatably supported in plate 330 and, through the offset gears 336, seen also in Figure 4, are connected to the rotatable shafts 338. Each of these shafts is supported in bearings between plate 330 and ring 334. The rear end of each shaft 338 protrudes beyond ring 334 and is fixed to one of the rockers 340, also seen in Figure 4. These rockers carry the pins 220, 222 which are engaged in turn by blocks 218 and 226 of slide 200 as described in connection with Figure 21.

As seen in Figure 22, journalled in respective radial grooves 341 in plate 330 are the slidable spokes 342. Each of these spokes, six in all, at its lower or inward end is connected to the left end of a corresponding pair of flat rails 320 which control the radial positions of push rods 55 associated with the mandrels. The top end of each spoke carries a roller 344 which runs in the track of the fixed ring cam 260. This cam surrounds plate 330 and ultimately controls the inward and outward movement of the push rods 55. The track in cam 260 is cut according to the desired movements of these rods.

Figure 23:
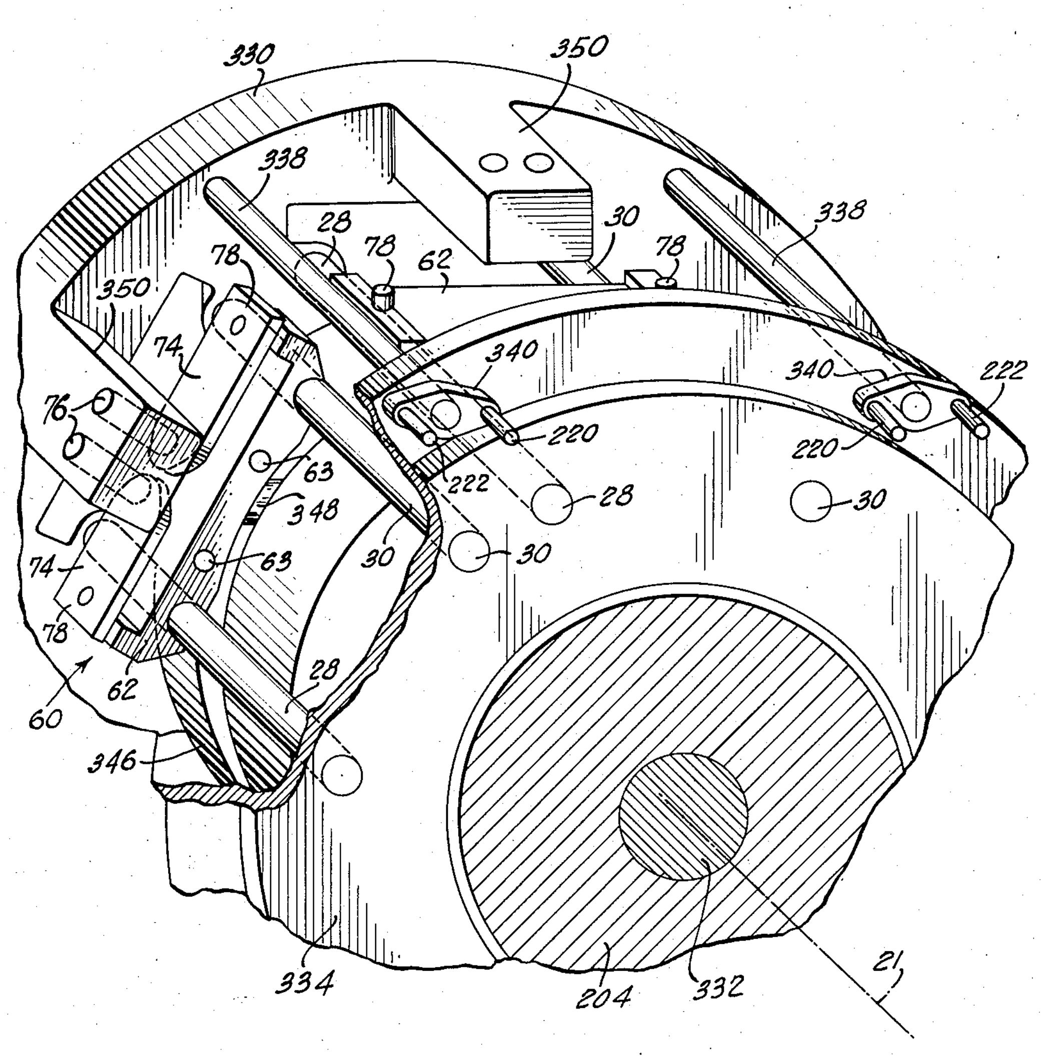
Figure 23 is a perspective view with parts broken away and others not shown of another portion of the end supports and operating mechanism for the Ferris-wheel.

Figure 23 is a perspective view of the rear sides of plate 330 and end ring 334. The butterfly carriages 62, described in connection with Figure 17, move back and forth along rods 28 and 30 in the space between plate 330 and ring 334. Each carriage 62 is guided in the track of a fixed drum cam 346 by a roller 348 depending from the carriage. Each pair of fixed pins 76, to which are pivoted the butterfly wings 74, are carried by the shoulders 350 on the rear of plate 330. These shoulders are evenly spaced around the rim of the plate and each is on a radius midway between each rod 28, 30. When plate 330 rotates on its axle 332, the butterfly carriages are moved back and forth relative to the plate to give the mandrel spacings previously specified. Similarly, the spokes 342 are moved radially in and out by ring cam 260. The rotation of axle 332 which is rotatably supported in hub 204 is controlled by the Geneva drive previously mentioned.

Figure 24 is a section view, with some parts broken away, taken as indicated in Figure 22 and showing additional parts seen in Figure 21. The view of the mandrels 20 in Figure 24 is taken at station B and shows a strip P just as it is being folded over the mandrels by planes 40, 42. These planes are supported by rod 358 which at its left end is fixed to the block 360. This block slides in a groove 362, seen also in Figure 21, in the frame of machine 10. Block 360 carries a roller 364 which is moved up and down by the end of the fulcrum arm 276. Positioned beneath the block 360 is the short beam 210 which rides up and down on the pins 209 and which carries the left end of the beam 366 to which is affixed the pressure pad 38. Short beam 210 is adapted to rest against the shoulders 368 on pins 209 when the slide 200 is in its up position in order for pad 38 to be raised clear of the mandrels.

Figure 25:
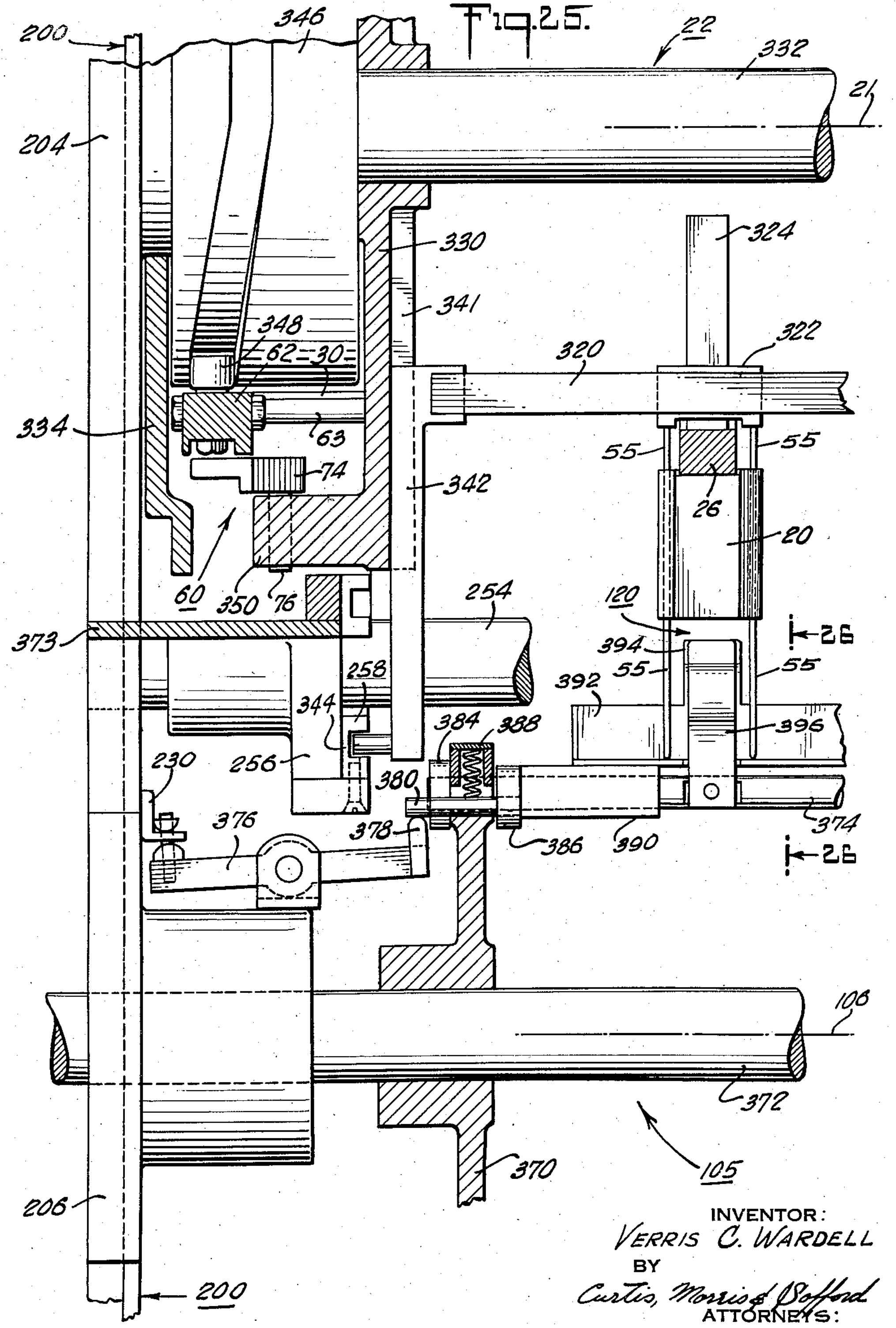
Figure 25 is a section view taken as indicated by line 25—25 in Figure 23, this view and that of Figure 24 being joining lower and upper portions, respectively.

Figure 25 is a continuation of the view of Figure 24 and shows the lower part of hub 204, plate 330, and the end ring 334. Figure 25 also shows hub 206 and the left end plate 370 which supports the rows of pocket brackets 120 of the Ferris-wheel 105. Plate 370 is mounted on axle 372 for rotation about the axis 106. Axle 372 is rotatably supported by hub 206 and is driven from axle 332.

As seen in Figures 24 and 25, supported from the outer rim of the hub 204 by the short sleeve 373 is the ring cam 260. This cam is supported around and just clearing the rim of plate 330. Drum cam 346 is similarly fixed to hub 204 and is supported thereby between plate 330 and end ring 334. In Figure 25 where the lower part of cam 260 is shown, the cam segment 258 is moved down from the cam thereby extending the push rods 55 of the mandrels at station E to their limit beyond the mandrels. Segment 258 is carried by the arm 256 also shown in Figure 21.

In Figure 25, supported near the rim of plate 370 and evenly spaced therearound, are the six shafts 374 which help carry the rows of brackets 120. In this figure only the shaft 374 and the row of brackets 120 at position 1 are shown, these being in the relative position previously indicated in Figure 2. Slide 200 in the position shown in Figure 25 is at its downmost limit. Accordingly, arm 230 on the slide has opened the brackets at position 1. This results from arm 230 depressing the left end of the link 376, which is pivoted to the hub 206 and which at its right end carries a cross bar 378. As seen here and in Figure 26, cross bar 378 bears against the pin 238, previously mentioned, and the pin 380 which are carried by the links 384, 386, respectively. These pins pass through elongated holes in plate 370 and are urged downward against the bottom of these holes by the compression springs 388 carried by plate 370.

Figures 26, 27, 28, 29:
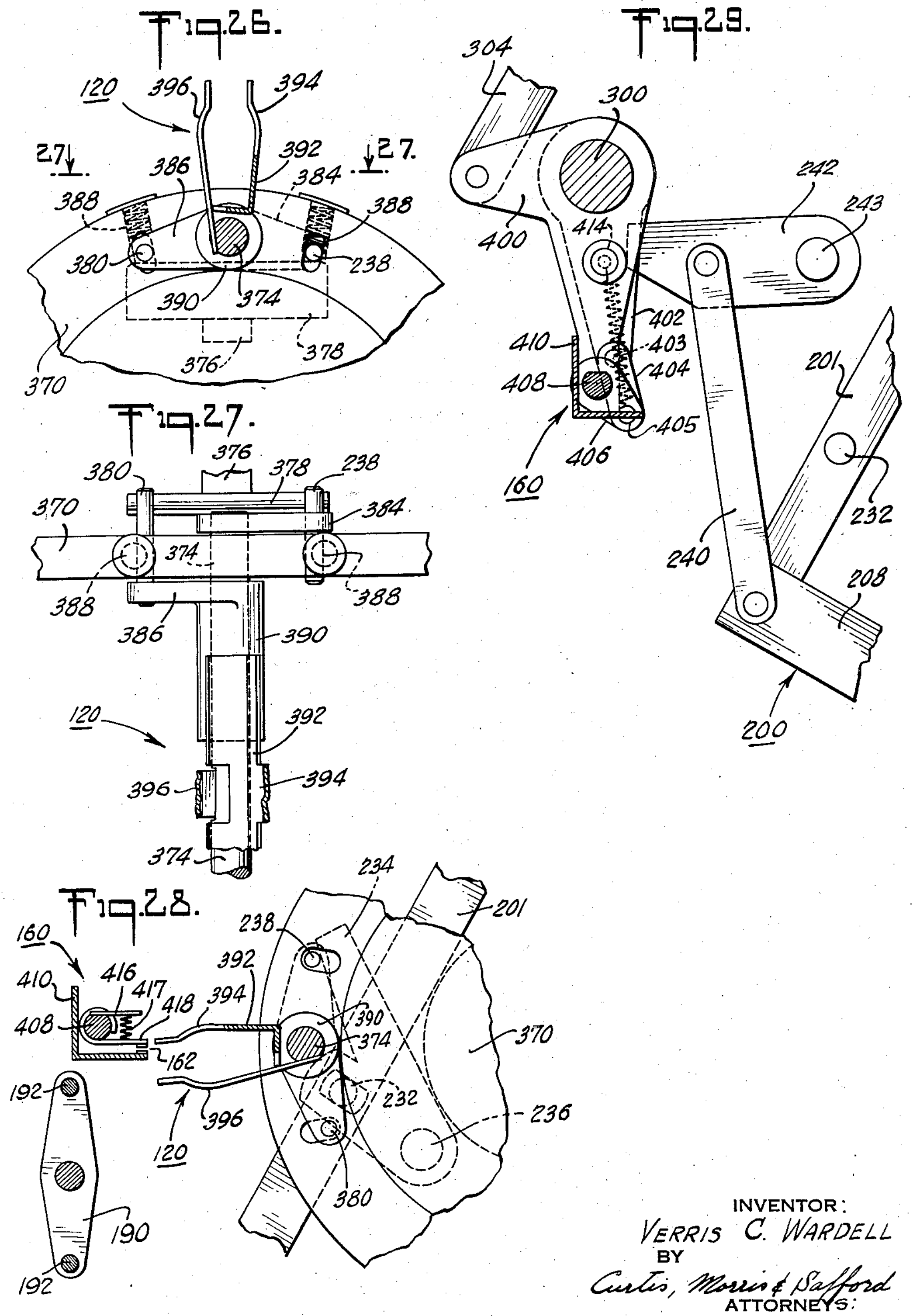
Figure 26 is a section view of a pocket bracket taken as indicated by line 26—26 in Figure 25.
Figure 27 is a section view taken as indicated by line 27—27 in Figure 26.
Figure 28 is an enlarged side view of the pocket brackets at position 3 in Figure 2 showing the parts just prior to the removal of the bags from the brackets.
Figure 29 is an enlarged view of the pendulum gripper arm opposite position 3 in Figure 2.

As seen in Figures 25 and 27, link 384 is fixed to the end of shaft 374 and link 386 is a continuation of the sleeve 390 mounted on shaft 374 and free to turn thereon. Sleeve 390 is connected to the L shaped bracket 392 which it supports parallel to shaft 374 and which runs the length of this shaft. Mounted on L shaped bracket 392 at points along its length determined according to the spacings of pocket brackets 120, are the twelve right hand plates 394 of the brackets as seen in Figure 26. Opposite these are the plates 396 carried on shaft 374 which complete the brackets 120. When cross-bar 378 bears upward against pins 238, 380 each of the brackets is opened as shown.

After the row of opened pocket brackets 120 shown in Figure 25 have been filled with tea bags from the mandrels at stations E, these parts being shown in the positions they would have just when the bags are completely placed in the opened brackets, the bags themselves, however, not being shown, this row of brackets is rotated to its next position. Before this can occur slide 200 is raised and the lever 376 released thereby closing the brackets. Thereupon, they are rotated about axis 106 to the next position, position 2, where each bag is sealed along its top by the bonding mechanism 140, as previously explained. Thereafter, the row of brackets is rotated to position 3. A different row of brackets is, of course, rotated from position 6 to position 1, and another from position 1 to position 2 at the same time.

Referring to Figure 28, after a row of brackets 120 filled with tea bags reaches position 3, slide 200 is moved downward to the position shown. Slide bar 201 through arm 234, previously described in connection with Figure 21, opens plates 396 of the brackets by bearing against pin 238 and thereby rotating shaft 374. Just before this happens, pendulum gripper 160 swings to the right to the position shown and grasps the top of each bag.

When the pendulum swings to the right, its jaws 162 are open and so the tops of the bags freely move into the space between them. Jaws 162 are closed just before the slide reaches the position shown. Referring to Figure 29, as slide 200 moves down, it pulls link 240 and arm 242 down, the end of the arm triggering a toggle mechanism in gripper 160 thereby closing jaws 162. Gripper 160 includes an arm 400 which is fixed on rotatable shaft 300 and is swung around the shaft axis by the link 304, this link being controlled in the way previously described. Closely behind arm 400 is a link 402 which is free to rotate on shaft 300 relative to arm 400. The lower end of link 402 is pivoted at 403 to a link 404 which in turn is pivoted at 405 to the link 406. This last is fixed to the shaft 408 which is rotatably carried by arm 400 near its lower end. Arm 400 also carries the L shaped bar 410 which comprises the lower part of jaws 162. For the parts positioned as shown, the pivot 403 lies to the left of the line of center of pivot 405 and shaft 300. Pivot 403 bears against a stop, not shown, being held against this stop by the tension spring 412 connected between pivot 405 and the stub 414 fixed to link 402. The toggle is pushed into this position by arm 242 bearing against stub 414 when the slide moves down.

Referring to Figure 28, shaft 408 has fixed to it at each place opposite a bracket 120, a plate 416 and, when the shaft is rotated to the position shown in Figure 29, each plate 416, through a compression spring 417, bears against its corresponding swinging plate 418. The swinging plates 418 comprise the upper parts of jaws 162 and, being free to idle on shaft 408, grip the tea bags between their front edges and the edge of L bar 410 when urged downward by springs 417. Jaws 162 are released when gripper 160 swings to its leftmost limit by a fixed stop (not shown) which pushes pivot 403 to the right of the center line between pivot 405 and shaft 300.

From the above description it will be understood that each of the two Ferris-wheels 22 and 105 is supported at both ends for rotation about its respective axis, the action of the parts carried by these Ferris-wheels being controlled from their ends. Each of the Ferris-wheels is rotatively balanced and therefore they can be driven at relatively high speed with little or no vibration and by a small amount of power. Thus, not only is machine 10 very efficient in operation, it is also very durable and will have a long and trouble free service life.

The above description of the invention is intended in illustration and not in limitation thereof. Various changes may occur to those skilled in the art and these may be made without departing from the spirit or scope of the invention as set forth.

I claim:

1. The method of forming a plurality of individual bags from a single strip of bag material comprising the steps of taking a generally rectangular strip of bag material, folding it into a U-shaped form having two ends separated by a given length, having two faces substantially parallel to each other and separated by a given width and joined by a web at one side along their length, moving the two ends of said U-shaped form closer together, and joining said parallel faces directly to each other transverse to their length along lines at their two ends and along at least one line between their two ends while maintaining the separation between said faces at other places along their length.

2. The method as in claim 1 in further combination with the step of distending said web outward relative to said U-shaped form near the places where said faces are to be joined to each other whereby said faces can be heat sealed to each other without wrinkles or folds.

3. The method as in claim 1 in further combination with the steps of depositing a quantity of material within said U-shaped form between each two adjacent lines along which said faces are joined together, and then joining said faces together lengthwise along their side opposite said web.

4. The method of forming a plurality of individual packets from a single strip of material comprising placing said strip in channeled shaped fashion over the sides and ends of a plurality of mandrels that are spaced apart from each other and arranged in a row, moving said mandrels so that the faces of said strip can be brought together for sealing along lines at the two ends of said strip and between each two adjacent mandrels, sealing the faces of said strip along said lines to form a partially completed packet around each of said mandrels, and after said mandrels have been removed from and a quantity of material has been deposited in each of said partially completed packets sealing each along its remaining unsealed side.

5. In an arrangement for forming a plurality of individual packets from a single strip of material, a plurality of rectangular box-shaped mandrels spaced apart in a row, having front and rear faces, being supported at their bottom ends and having their top ends free, means for folding a flat strip of material over the top ends and the front and rear faces of said mandrels, means for moving said mandrels closer together, and means for simultaneously joining the faces of said folded strip along lines at the two ends of said strip and between each two adjacent mandrels.

6. In a bag-making machine, a plurality of mandrels arranged in a row and spaced by substantially equal distances means for folding a flat strip of bag material into a U-shaped channel over said plurality of mandrels, and means for moving said mandrels closer together while said strip is held to each of said mandrels, whereby the inner faces of said channel can be brought together between said mandrels.

7. In a bag-making machine wherein a plurality of individual bags are simultaneously made from a wide short length strip of flat unfolded bag material cut from a large supply roll, a plurality of mandrels arranged in a row, means to feed said short strip of bag material over the top of said mandrels, and means to clamp said strip to said mandrels and to fold it thereupon the length of said row of mandrels being slightly less than the width of said strip.

8. The combination of elements as in claim 7 in which said short strip of bag material is fed lengthwise at right angles to said row of mandrels to position it above them.

9. In an arrangement for forming a plurality of individual packets from a single strip of material, a plurality of more than two mandrels arranged in a row and adapted to have folded over them a single strip of material, adjacent ones of said mandrels being spaced apart by substantially equal distances, and means for moving said mandrels closer together or farther apart, said means acting to keep said mandrels spaced by substantially equal though variable distances whereby after said strip of material has been folded over said mandrels, they can be moved closer together so that the faces of said strip can be brought directly together in the spaces between adjacent mandrels without tearing said material when it is clamped to each of said mandrels.

10. In an arrangement for forming a single strip of material into a plurality of individual packets, a plurality of mandrels arranged in a row and spaced apart by substantially equal distances, means for folding a single strip of material into a U-shape upon said mandrels, gripping means for holding said strip in engagement with each of said mandrels, and means for moving said mandrels closer together after said strip has been folded thereupon and engaged by said gripping means whereby the faces of said strip can be joined together along two opposite sides of each mandrel.

11. The combination of elements as in claim 10 in which said gripping means includes a pair of fingers associated with each of said mandrels and adapted to clamp the edges of said strip to said mandrel on opposite sides thereof.

12. In a bag making machine, a plurality of mandrels arranged in a row, means adapted to move said mandrels toward and away from each other in the direction of said row, clamping means for securing a strip of bag material to each mandrel during a bag forming operation, said clamping means including a pair of spring urged holding fingers associated with each mandrel and adapted to bear against opposite sides of said mandrel, and unlocking means for moving at the same time each pair of said holding fingers away from its mandrel to permit the folding of a strip of material upon said mandrels, said unlocking means including a first and a second camming member, said first and second members being spaced apart parallel to each other and said row of mandrels and on opposite sides thereof, said first and second members being adapted for rotation in opposite directions and to slidably engage with each of said pairs of holding fingers, whereby said fingers can be kept open or closed even though said mandrels move relative to each other.

13. In a bag making machine wherein a plurality of individual packets are to be formed at the same time from a single strip of material, a Ferris-wheel arrangement of a given number of rows of mandrels, each row containing a plurality of mandrels spaced apart parallel to the axis of the Ferris-wheel, said mandrels being moveable toward and away from each other along the direction of said row, clamping means associated with each mandrel for securing a strip of material to each mandrel in a row after the material has been folded thereupon, and a number of elongated control members each positioned between adjacent rows of mandrels and parallel thereto and adapted to engage clamping means associated with each mandrel in two adjacent rows, each of said elongated members being rockable back and forth and being adapted to control said clamping means regardless of the spacings of said mandrels.

14. The combination of elements as in claim 13 in which each clamping means includes a pair of holding fingers adapted to move against opposite sides of their corresponding mandrel, and in which each of said holding fingers associated on one side with the mandrels in two adjacent rows has an extension which extends generally at right angles to and is engageable by one of said elongated members.

15. In the method of making bags, the steps of folding a single sheet of bag material over a plurality of mandrels spaced apart in a row, securing said strip to each of said mandrels, moving said mandrels closer together thereby to slacken the portions of said strip between adjacent mandrels, sealing said strip on opposite sides of each mandrel, separating said strip into a plurality of pieces with one piece formed around each mandrel, moving said mandrels farther apart, and removing said pieces from said mandrels.

16. In a machine of the character described wherein a plurality of mandrels in a row are to be moved closer together while a single strip of flexible material is fastened to them, a plurality of mandrel carriages, supporting means upon which said mandrel carriages are carried in movable relation to each other, a plurality of parallel rods, one rod attached to each mandrel carriage at one end of the said rod, and a cam assembly attached to the other end of each of said rods and adapted to move each rod a proportional amount of a predetermined distance whereby said mandrels can be moved together without tearing said strip of material which is fastened to them.

17. In a machine of the character described wherein a plurality of mandrels arranged in a row having a mid-point or centerline and spaced apart by equal distances are to be moved inward from each end of the row to bring them closer together while maintaining equal distances between them, a plurality of mandrel carriages, supporting means upon which said mandrel carriages are carried in movable relation to each other, a first butterfly cam assembly arranged at one end of said row of mandrels and a second butterfly cam assembly arranged at the other end of said row, a first set of parallel rods, each extending from said first cam assembly to a mandrel carriage lying on one side of the centerline of said row, a second set of parallel rods, each extending from said second cam assembly to a mandrel carriage lying on the other side of said centerline, said cam assemblies being adapted to move each rod a proportional amount of a predetermined distance whereby the mandrel carriages farthest from said centerline are moved more than the mandrel carriages nearer thereto.

18. In a machine of the character described, six rows of mandrels arranged on a Ferris-wheel and rotatable around an axis, each row being parallel to said axis and symmetrically spaced therearound, said mandrels being supported at their bottom ends and extending radially outward from said axis, drive means for rotating each of said rows of mandrels successively past a filling station near the top of said Ferris-wheel, a strip forming and folding station, a strip face sealing station, a cutting station, a bag removing station, and an open station, and spacing means in conjunction with said drive means for moving said mandrels in each row closer together as they rotate from said forming and folding station to said sealing station and farther apart before they rotate back to said forming and folding station.

19. The combination of elements as in claim 18 in which said spacing means includes a fixed drum cam past which said Ferris-wheel rotates, and a cam assembly associated with each row of mandrels and engageable with said drum cam to control the spacings of the mandrels in each row.

20. A machine of the character described and including a plurality of rows of mandrels rotatably supported symmetrically about an axis and parallel thereto, means to rotate each of said rows successively in steps past a plurality of bag forming and sealing stations, and means to control the spacings of the mandrels in each row as said row is rotated, said means including a fixed drum cam relative to which said rows are rotated, and a cam assembly associated with each of said rows and engageable with said drum cam.

21. In a machine of the character described, a Ferris-wheel comprising a plurality of mandrel carriages symmetrically positioned along chords of a circle around an axis and angularly adjacent each other, a plurality of mandrels each mounted on a respective carriage, clamping means associated with each of said angularly adjacent carriages for securing strips of material to the mandrels mounted on said carriages, a plurality of control members for actuating said clamping means, one control member being positioned at the ends between angularly adjacent mandrel carriages, and means for operating in sequence each control member in one direction and then in another, two control members being operated at the same time, whereby each control member alternatively actuates the clamping means associated with one mandrel carriage and then the clamping means associated with an angularly adjacent mandrel carriage.

22. The combination of elements as in claim 21 in which said clamping means includes holding fingers journalled through each mandrel carriage and extending from opposite ends thereof, and in which each of said control members includes a slotted tube-like rod adapted to engage the ends of the holding fingers extending from the two adjacent ends of two angularly adjacent mandrel carriages, said rods each being rotatable in one direction and then in the opposite direction.

23. The combination of elements as in claim 22 in which there are six mandrel carriages arranged at 60° intervals and in further combination with means for operating substantially simultaneously the two rods associated with a first mandrel carriage and the rods associated with a second mandrel carrige displced 180° from said first carriage.

24. In a machine of the character described wherein a plurality of rows of mandrels are arranged Ferris-wheel fashion in a closed circle and where each row of mandrels have associated with them clamping means, a plurality of control members each positioned between adjacent rows of mandrels and adapted to be rotated in one direction to engage the clamping means associated with the rows of mandrels on its one side and to be rotated in the opposite direction to engage the clamping means associated with the row of mandrels on its opposite side, the two control members associated with each row of mandrels being rotated in opposite directions to control the clamping means associated with said row of mandrels.

25. The combination of elements as in claim 24 wherein said control members are each a rod having elongated cam shoulders along its length, mounted parallel to said rows of mandrels and extending the length of said rows, whereby even though said rows are varied in length said rods can still control said clamping means.

26. In a machine of the character described wherein a plurality of mandrels are supported Ferris-wheel fashion for rotation about an axis past successive bag forming stations, and where each mandrel of said plurality is angularly displaced from adjacent mandrels, and where each is supported along a radial line from said axis and has an opening in its outer end, means to fold a single strip of bag material over each mandrel, and stretching means associated with each mandrel for pushing outward at opposite top corners of said mandrel the strip folded thereupon whereby the faces of the strip along two opposite sides of said mandrel can be brought directly together without folds or wrinkles, said stretching means including a pair of radially extending push rods for each mandrel, one rod of a pair being positioned along a side of its associated mandrel, the other rod being on the opposite side of said mandrel, said rods being adapted to move radially substantially the length of a bag being formed on a mandrel whereby said rods can be moved radially outward a distance sufficient to positively remove the bags from the mandrels.

27. The combination of elements as in claim 26 in which each pair of push rods is moved slightly outward beyond the end of its associated mandrel after a strip of material is folded thereupon, and is then moved a greater distance outward after the faces of said strip have been joined on opposite sides of said mandrels, and in further combination with cam means, and means engaging said cam means and actuating said push rods in accordance with said cam means.

28. The combination of elements as in claim 27 in which said cam means includes a fixed ring cam having a cutout portion on its periphery which is adapted to be moved radially outward from the remainder of said ring cam.

29. In a machine of the character described a first mandrel adapted to have folded upon it a strip of bag material, a second mandrel positioned opposite to said first mandrel and inverted relative thereto, said second mandrel being adapted to have a folded on it a strip of bag material when the strip on said first mandrel has been formed into a partially completed bag, clamping means for securing a strip of material to each mandrel, a strip folding station, a bag removing station positioned opposite said folding station and on a line therewith and with said first and second mandrels, and slide means for simultaneuosly releasing said clamping means on each of said mandrels and for preparing said bag receiving station to accept bags from one of said mandrels.

30. The combination of elements as in claim 29 in which said bag receiving station includes a bag holding bracket having opposing faces spring loaded toward each other and being openable by said slide means to receive a bag.

31. In a machine of the character described wherein a plurality of mandrels is moved step by step past a plurality of work stations, a row of mandrels spaced apart from each other along a generally straight line, means for moving said row of mandrels in a direction transverse to said line, a bonding station including a plurality of scissor-like sealing jaws spaced apart along a line parallel to said straight line and adapted to open and close on an axis therealong to seal a strip of paper folded over said row of mandrels between and alongside of each, whereby as said row of mandrels is being moved into the jaws of said bonding station, said jaws can be moved toward closed position even before said mandrels are at rest.

32. In a machine of the character described, a bonding station including a plurality of scissor-like heat sealing jaws openable around and spaced apart along an axis, a row of box-like mandrels supported at their bottoms, spaced apart along a line, lying along a plane, and having their top ends open and aligned, means to cover said mandrels with a single strip of bag material coated on its inner surface with a thermosetting adhesive and which is generally channel shaped and is evenly folded on said mandrels with its web enclosing their open ends, and means to move said row of mandrels in proximity to said bonding station with the top ends of said mandrels nearest to and from their bottom ends farthest from the axis of said jaws, said mandrels being spaced so that when said jaws close they will seal said strip along lines alongside each of said mandrels, whereby the chance that a jaw will stick to said strip along a line between mandrels is made very nearly zero and any sticking of a jaw to the strip on the outside of an end mandrel in a row will be very limited in bad effect.

33. In a machine of the character described, a Ferris-wheel including a first lateral row of mandrel assemblies spaced apart and having a paper gripping finger associated with each assembly, a second lateral row of mandrel assemblies spaced apart, angularly displaced from said first row and having a paper gripping finger associated with each assembly, a slotted rod-like member parallel to each of said rows, positioned in the space between them, adapted to engage each of said gripping fingers and to rotate in one direction and then the other to exert a force on each transverse to said member, said member being adapted to bear against said assemblies to keep from bowing.

34. In a machine of the character described, a mandrel carriage assembly comprising a beam-like carriage having a plurality of bearing openings transverse to its length to permit the carriage to slide on support rods, a hollow box-like mandrel supported between the ends of said carriage and having through it two push rod openings lying in a plane transverse and perpendicular to the length of said carriage, a guide plate lying in said plane and connected to the underside of said carriage, a block slidable on said plate, a pair of push rods connected to said block, extending through said push rod openings and having a length at least twice that of a bag to be formed on said mandrel, and a pair of holding fingers covered by said carriage and adapted to bear against opposite faces of said mandrel and to move lengthwise of said carriage with ends extending beyond the ends of said carriage.

35. In a package making and filling machine, a mandrel Ferris-wheel adapted for rotation step by step around an axis past a plurality of surrounding work stations and comprising, two spaced apart end plates rotatable about an axis, a plurality of mandrel carriage assemblies, a plurality of pairs of bearing rods symmetrically positioned in rows around said axis and connected between said plates, said carriages being carried in rows on said bearing rods and slidable therealong, and a plurality of rows of spacer rods, at least one spacer rod in a row connected to a corresponding one of said carriages, passing through other carriages in the row and positioned parallel to said bearing rods, said bearing and spacer rods supporting said carriages and said carriages maintaining the spacings of said rods whereby said Ferris-wheel is relatively very rigid along its axis.

36. The combination of elements as in claim 35 in further combination with two end rings each spaced beyond the outer face of a respective one of said plates, being supported thereby in cantilever fashion, and a plurality of butterfly assemblies positioned in the space between a ring and plate, at least one assembly being associated with each row of mandrel carriage assemblies and being slidable laterally relative to said plate, and a fixed drum cam for controlling the lateral position of said butterfly assemblies.

37. The combination of elements as in claim 35 wherein each mandrel carriage assembly includes a mandrel and a pair of holding fingers spring urged against opposite faces of the mandrel to closed position and operable from the ends of the assembly, and in further combination with a plurality of rod-like bars each positioned between adjacent rows of carriages and rotatable back and forth, said rods being supported between said plates, the pair of rods associated with each row being adapted to open each pair of holding fingers of the mandrels in the row in unison, each adjacent two rods being actuated in turn.

38. In a bag making and filling machine wherein a bag material folding station is spaced opposite a bag removing and receiving station and position and wherein mandrels in succession are adapted to be moved past said stations to be first covered with bag material and then uncovered, each mandrel having gripping means for holding to itself the bag material: means for shearing a short strip of bag material and for clamping it to a mandrel at the folding station, control means associated with and moveable with each mandrel for opening the gripping means associated with the mandrel when at the folding station and for opening the gripping means associated with the mandrel when at the removing station, means for opening pocket brackets at the receiving position, and slide means not moveable with the mandrels for controlling all of said means substantially in unison and including a slide bar adapted to move back and forth along a straight, short track, whereby a single slide means can in turn actuate each control means after its associated mandrel has reached one of said opposite stations.

39. The combination of elements as in claim 38 wherein there is a bag discharging position and in further combination with a gripper arm opposite the discharging position and having bag holding jaws, and in which said slide means also controls the closing of the jaws of the gripper and the opening of pocket brackets at the discharging position.

40. In a machine of the character described, a row of pocket brackets including a shaft, a first plurality of plates spaced apart and fixed to said shaft, an L-shaped bar supported parallel to said shaft and rotatable relative thereto, a second plurality of plates fixed to said bar and positioned to mate with said first plurality of plates to form pocket brackets, and means to rotate said shaft and bar relative to each other to open and close said brackets.

41. The combination of elements as in claim 40 in further combination with a plate rotatably supported and rotatably supporting said shaft and bar, said plate carrying at least one spring biasing said brackets closed.

42. In a machine of the character described wherein there is a bag discharging position including a plurality of bag holding pockets spaced apart along a row: a pendulum gripper including a swingable arm, and L-shaped bar carried by the lower end of said arm and comprising one part of a plurality of jaws each opposite a pocket and adapted to grip a bar, a rotatable shaft carried by said arm and running parallel to said bar, a plurality of spring loaded plates carried by said shaft and forming the other parts of the jaws, and a toggle mechanism carried by said arm and acting to lock and unlock said jaws by rotating said shaft.

43. A bag making and filling machine comprising a first Ferris-wheel for supporting symmetrically six rows of hollow mandrels open end outward for rotation about a horizontal axis, a plurality of mandrels and carriage assemblies mounted in each of the six rows on said Ferris-wheel and slidable closer together and farther apart, a filling station mounted adjacent the rim of said wheel near the top thereof for dispensing bulk material to the open end of each mandrel in a row, a folding station near the top of said wheel and spaced from said filling station by the angular distance between rows and adapted to fold a single, short-length sheet of bag material over the mandrels in a row enclosing their open ends, gripping means for clamping the sheet of bag material to each mandrel, spacer-rod means for moving each row of said mandrels and carriage assemblies closer together after a sheet of bag material has been folded thereon, a bonding station near the side of said wheel spaced from said folding station by the angular distance between rows and adapted to seal said sheet of material alongside each mandrel, said bonding station including spaced jaws openable about a horizontal axis, a cutting station spaced from said bonding station by the angular distance between rows and including spaced scissors openable about a horizontal axis and adapted to cut the sealed strip on each row of mandrels between each mandrel, a bag removing station near the bottom of said wheel spaced from said cutting station by the angular distance between rows and adapted to take each partially formed bag from its associated mandrel in each row, gravity transferring the bulk material in the mandrel to the bag, means for receiving the bags from said bag removing station and for delivering them to subsequent work stations, and control means for actuating from the end of said Ferris-wheel said gripping means and said spacer-rod means so that said mandrels can be moved together in rotating between said folding and bonding stations and thereafter moved apart before returning to said folding station and so that said gripping means associated with each row of mandrels can be opened and then closed at said folding station, held closed until reaching said removing station and then opened.

44. The combination of elements as in claim 43 in which said means for receiving includes a second Ferris-wheel carrying at least three rows of pocket brackets for rotation about a horizontal axis, said pocket brackets being spaced pairs of opposing plates adapted to be opened and closed in unison from the end of said second wheel, and positioned to receive directly and in turn row by row the bags removed from mandrels at said bag removing station.

45. The combination of a bag making and filling machine including means for supplying at one stroke a plurality of bags, gripping means for taking each bag, passing them in unison over a bag abusing means to test each for soundness and then delivering them to a gravity feed station; and a cartoning machine positioned below said gravity feed station and adapted to deliver each bag received at one stroke to a carton or cartons via a feed chute for each bag.

References Cited in the file of this patent

UNITED STATES PATENTS

| | | |
|---|---|---|
| 2,168,543 | Vergobbi | Aug. 8, 1939 |
| 2,203,510 | Smith et al. | June 4, 1940 |
| 2,281,582 | Irmscher | May 5, 1942 |